US012719978B2

(12) United States Patent
Keegan et al.

(10) Patent No.: US 12,719,978 B2
(45) Date of Patent: Aug. 25, 2026

(54) MOBILE PHONE CASE WITH COMPARTMENT CONFIGURED TO STORE AND PROVIDE QUICK ACCESS TO A POD OF SANITIZING WIPES

(71) Applicant: Wype N' Go, LLC, New York, NY (US)

(72) Inventors: Lauren Keegan, New York, NY (US); Alexandros Papadopoulos, New York, NY (US); Anastasios Papadopoulos, New York, NY (US); Bradley Sauln, Dorchester, MA (US)

(73) Assignee: Wype N' Go LLC, New York, NY (US)

( * ) Notice: Subject to any disclaimer, the term of this patent is extended or adjusted under 35 U.S.C. 154(b) by 336 days.

(21) Appl. No.: 18/610,312

(22) Filed: Mar. 20, 2024

(65) Prior Publication Data

US 2024/0283861 A1 Aug. 22, 2024

Related U.S. Application Data

(63) Continuation-in-part of application No. 17/331,807, filed on May 27, 2021, now Pat. No. 11,957,281.

(Continued)

(51) Int. Cl.
*H04B 1/38* (2015.01)
*A47K 10/34* (2006.01)

(Continued)

(52) U.S. Cl.
CPC ............. *H04M 1/724* (2021.01); *A47K 10/34* (2013.01); *A47K 10/42* (2013.01); *A47K 2010/389* (2013.01)

(58) Field of Classification Search
CPC ...... H04M 1/724; H04M 1/17; H04M 1/0203; H04M 1/0252; H04M 1/026; A47K 10/34; A47K 10/42; A47K 2010/3266
See application file for complete search history.

(56) References Cited

U.S. PATENT DOCUMENTS

| | | | | |
|---|---|---|---|---|
| 2022/0116491 | A1* | 4/2022 | Chiang | F16M 11/38 |
| 2022/0346513 | A1* | 11/2022 | Martinez | A45C 7/0077 |
| 2023/0199464 | A1* | 6/2023 | Baldree | H04B 1/385 455/404.1 |

OTHER PUBLICATIONS

Press Fit Forces Stress Design Calculator, Jun. 18, 2018, available at: www.engineersedge.com/calculators/machine-design/press-fit/press-fit.htm.

(Continued)

*Primary Examiner* — Tuan Pham
(74) *Attorney, Agent, or Firm* — Thomas A. O'Rourke; James Bongiorno; O'Rourke IP Law PLLC

(57) ABSTRACT

A pod assembly magnetically mounts to any ferromagnetic metallic object using a particularly shaped magnet, and includes: a mounting member, a container portion, and a strip. The container is formed of a plurality of walls creating a cavity to house sanitizing wipes, which are access through an opening formed in one wall. The strip releasably adheres to the container portion to seal and unseal the opening, to house the sanitizing wipes in a waterproof manner. The mounting member includes a web, a frame, and a magnet. The frame extends away from the web and includes a plurality of stiffeners. A recess may be formed by one of the stiffeners and/or a recess in the web, being usable to house the magnet, which magnet has a particular peripheral shape that matches the depth and shape of the recess. The container portion is mounted to the flat side of the web.

8 Claims, 31 Drawing Sheets

Related U.S. Application Data

(60) Provisional application No. 63/033,330, filed on Jun. 2, 2020.

(51) Int. Cl.
*A47K 10/42* (2006.01)
*H04M 1/724* (2021.01)
*A47K 10/38* (2006.01)

(56) References Cited

OTHER PUBLICATIONS

"Three General Types of Fit," available at www.mmto.org/dclark/Reports/Encoder%20Upgrade/fittolerences%20%5BRead-Only%5D.pdf., Jul. 8, 2019.
"Engineering Fit," available at: https://en.wikipedia.org/wiki/Engineering_fit, Jul. 8, 2019.

* cited by examiner

FIG. 3
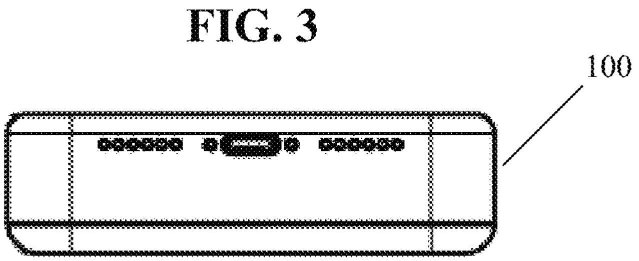
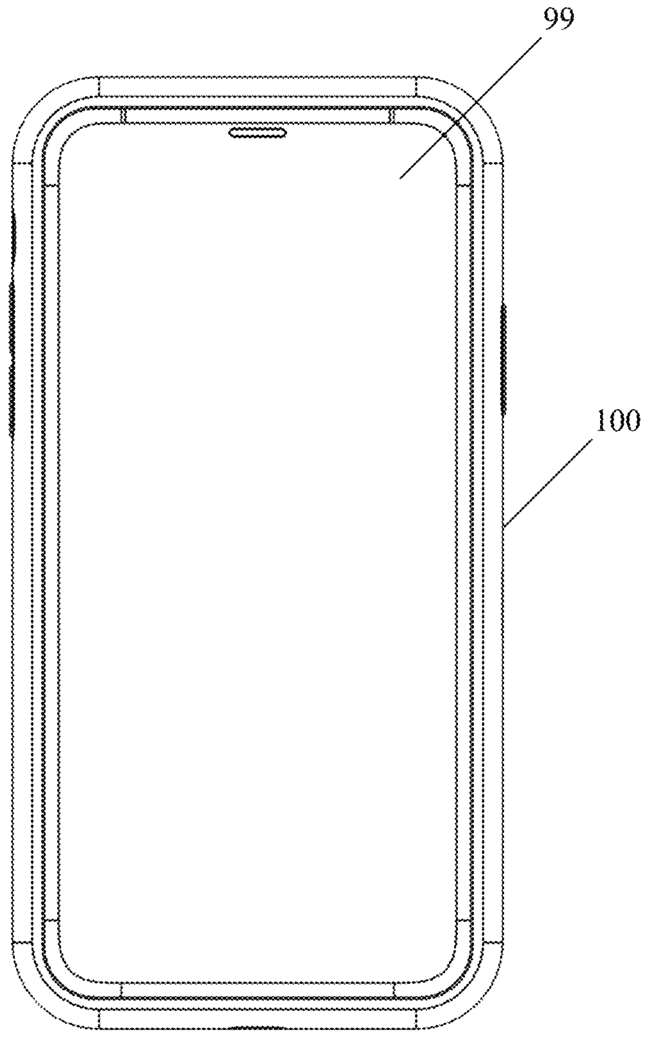
FIG. 2

120

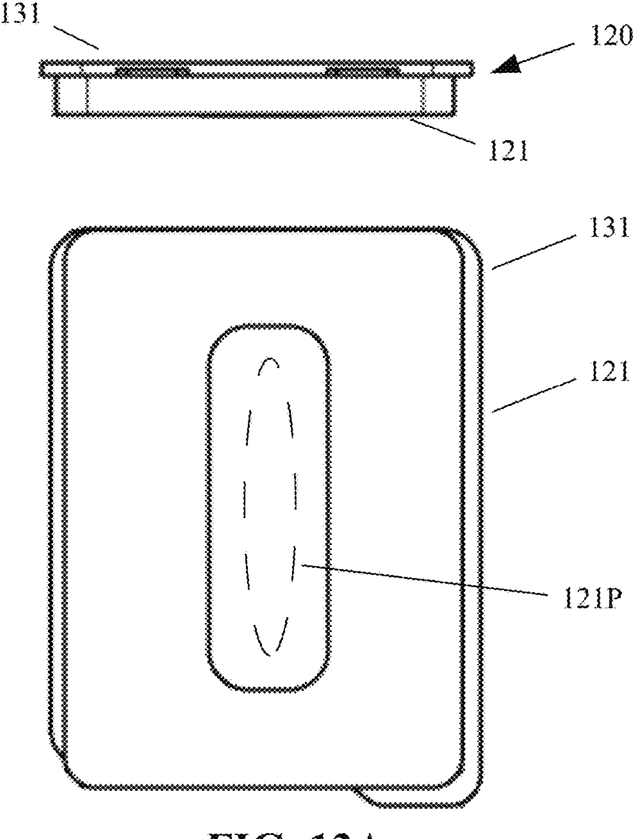
FIG. 13A
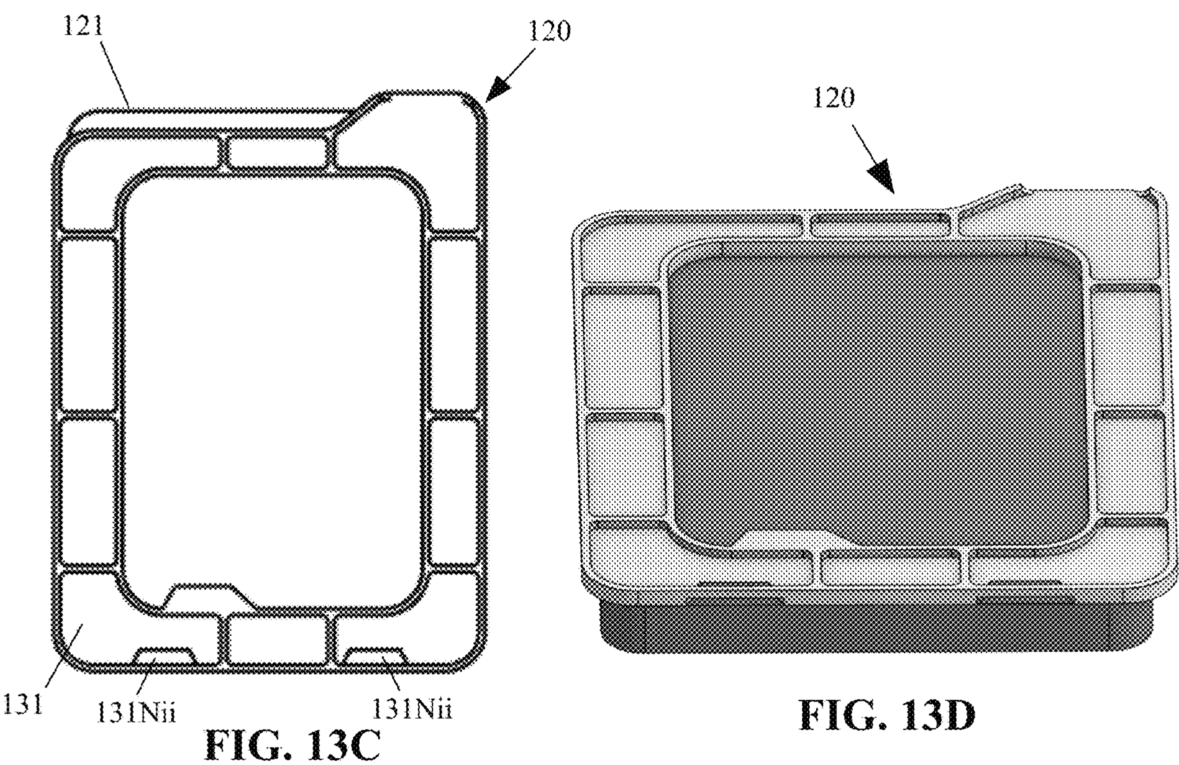
FIG. 13C
FIG. 13D

FIG. 25
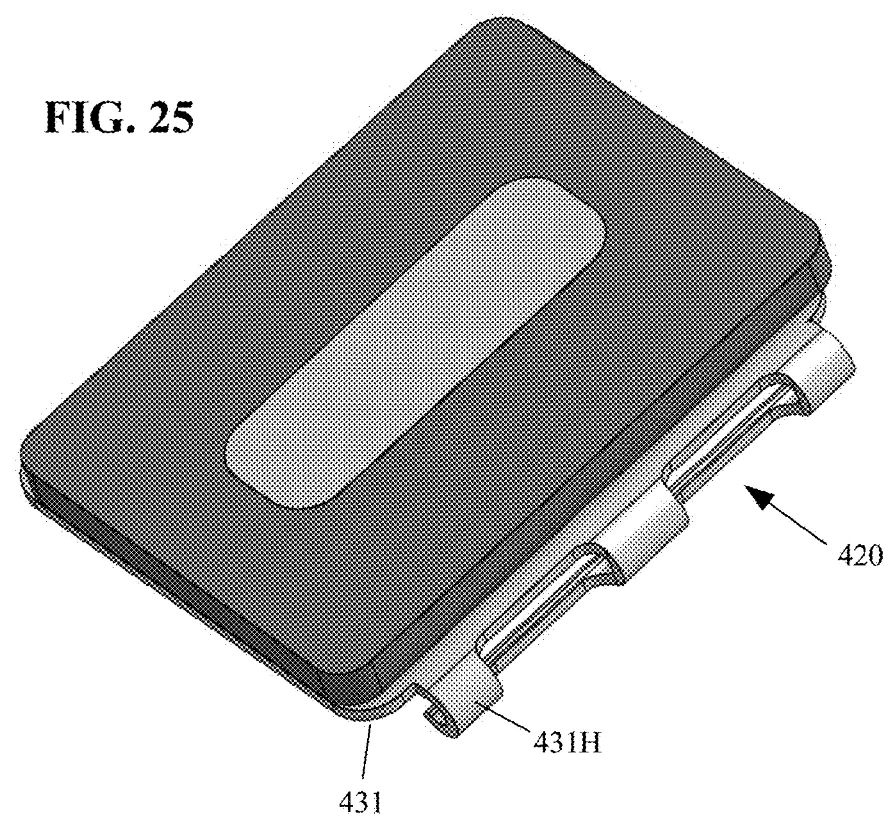
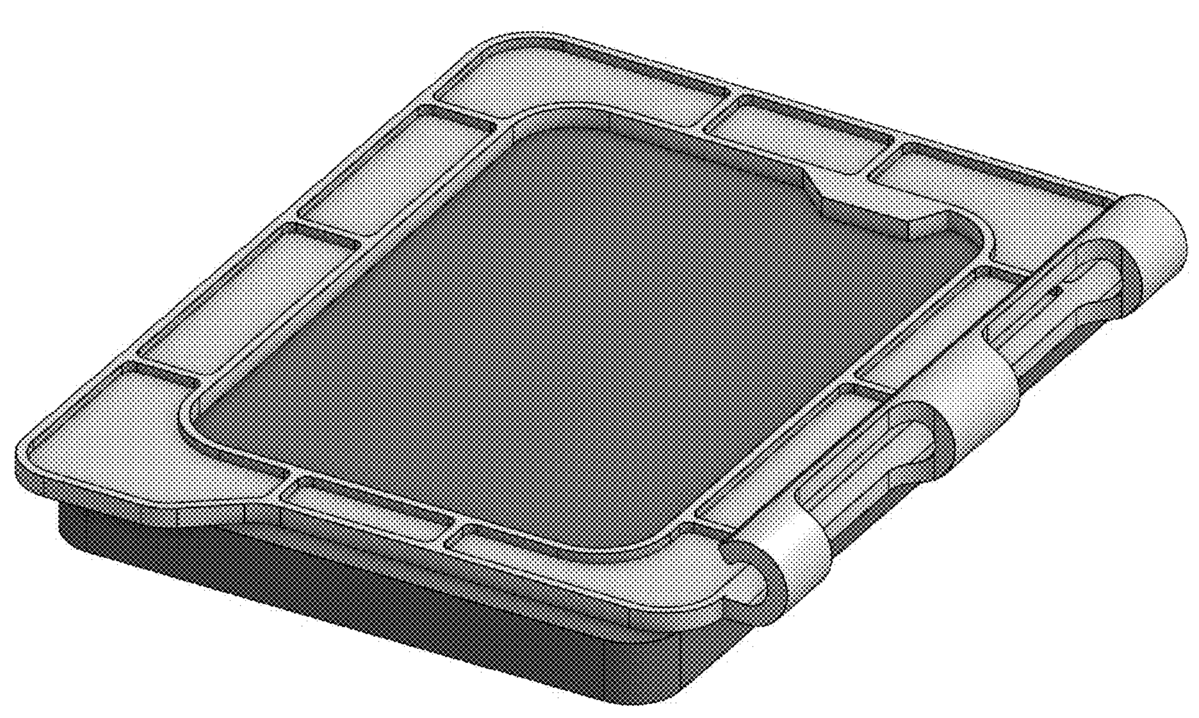
FIG. 26

FIG. 27
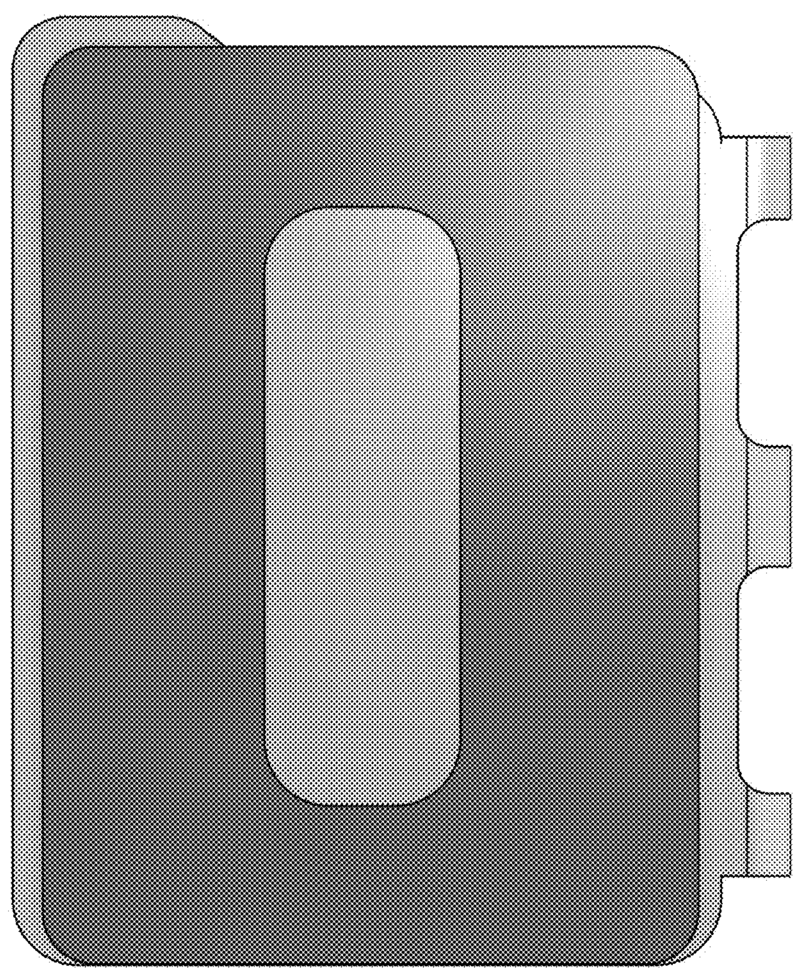
FIG. 28

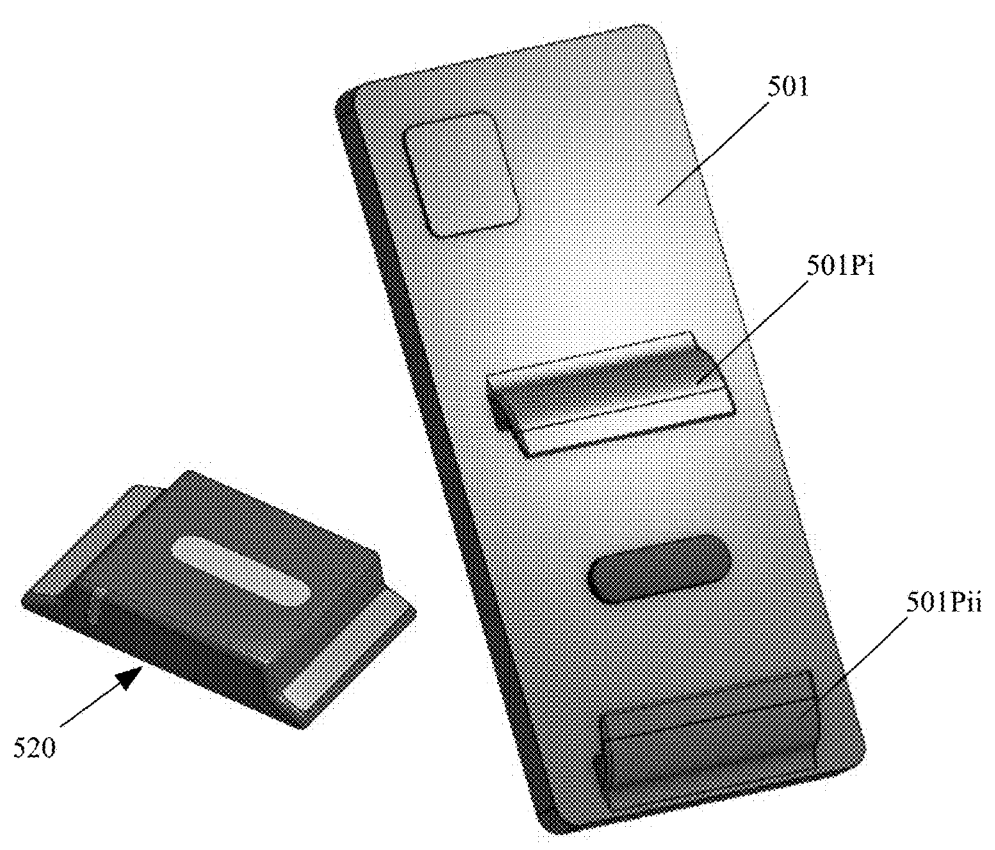
FIG. 29
FIG. 30
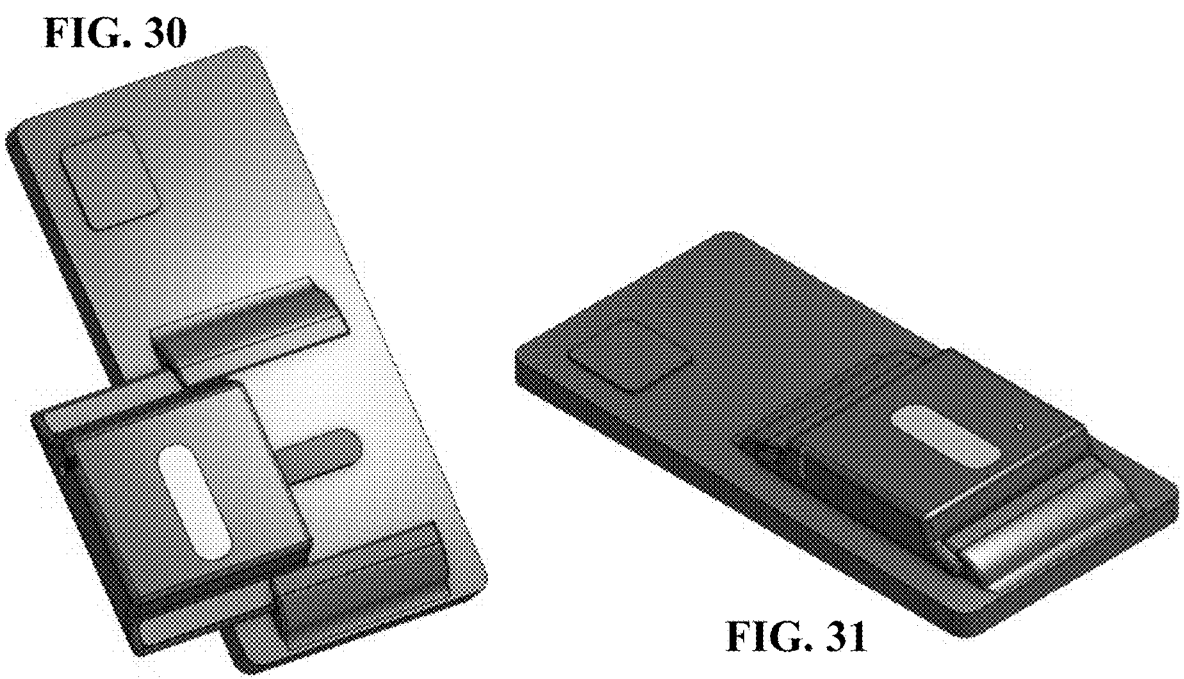
FIG. 31

FIG. 38
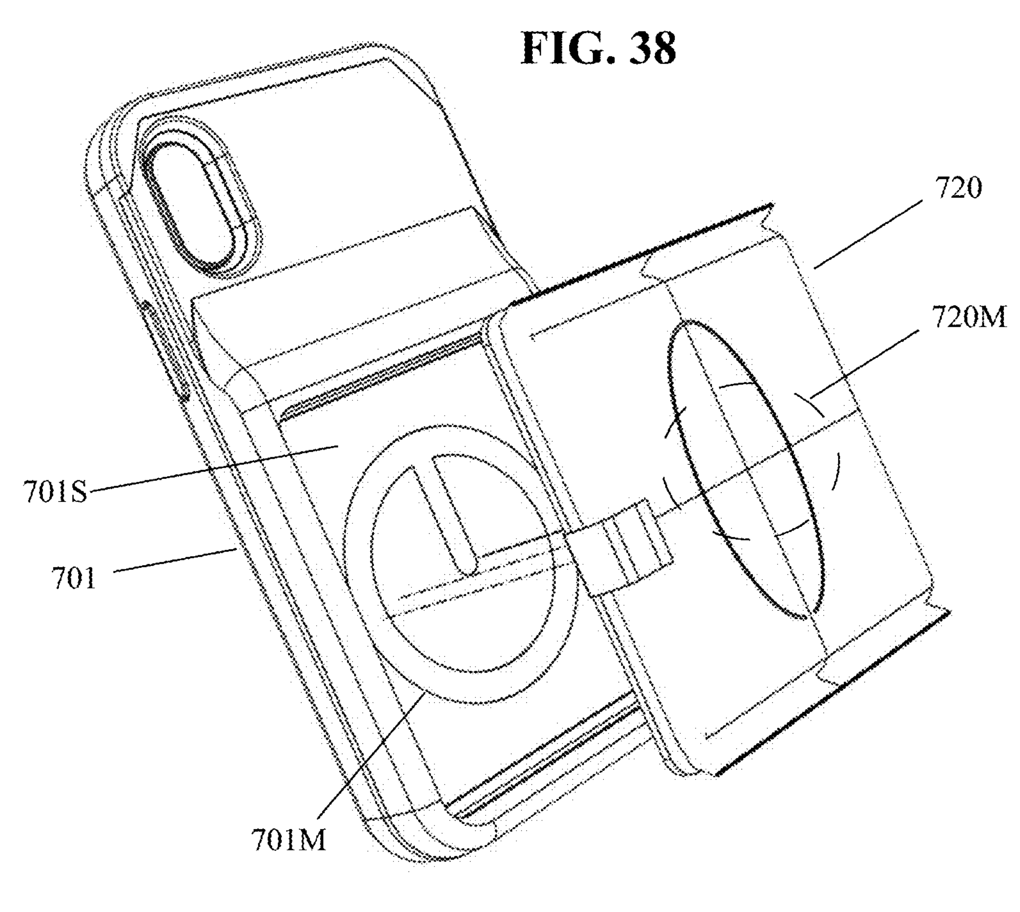
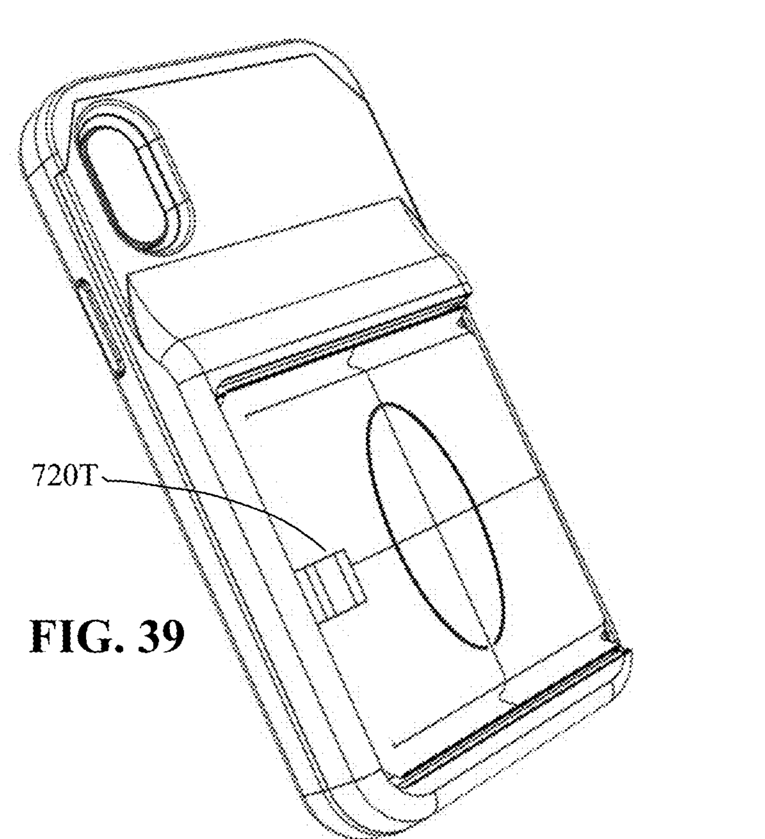
FIG. 39

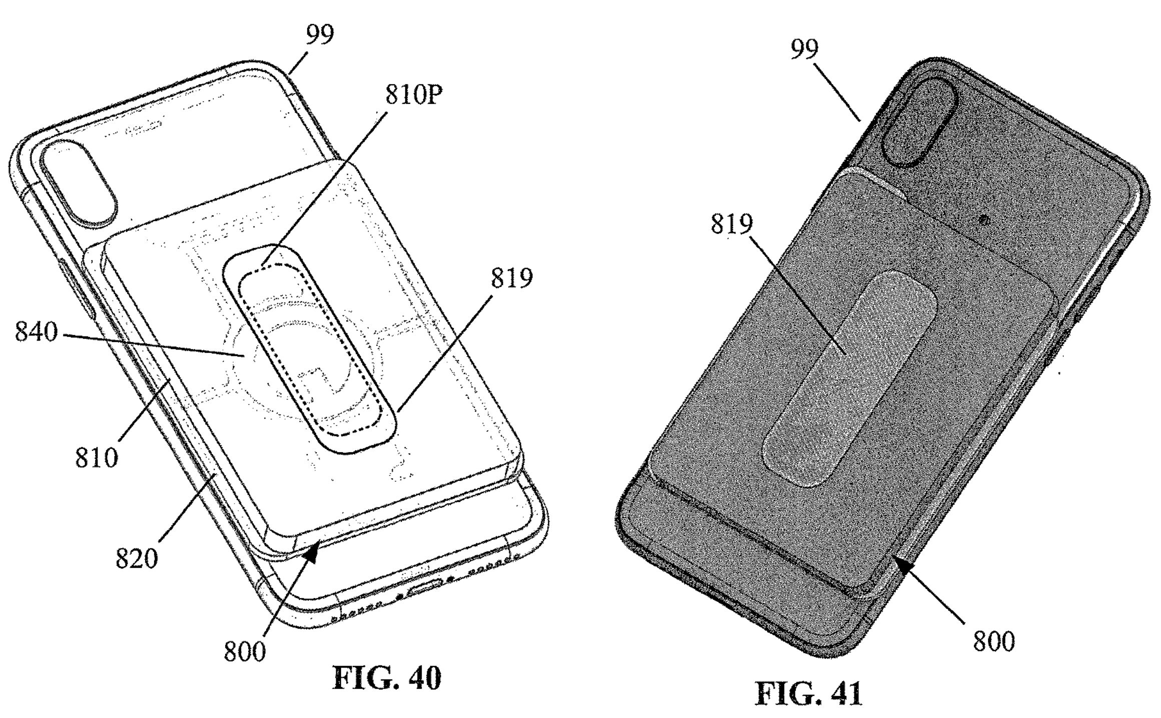
FIG. 40
FIG. 41
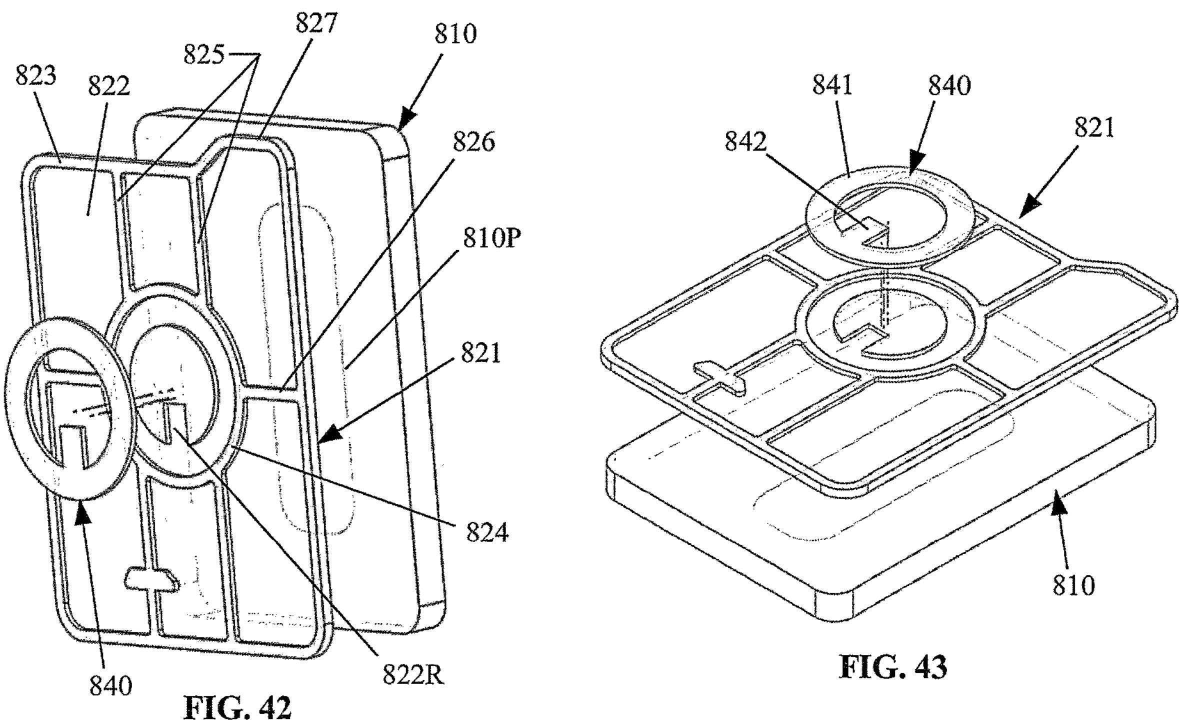
FIG. 42
FIG. 43

MOBILE PHONE CASE WITH COMPARTMENT CONFIGURED TO STORE AND PROVIDE QUICK ACCESS TO A POD OF SANITIZING WIPES

CROSS REFERENCES TO RELATED APPLICATIONS

This is a continuation in part application of U.S. patent application Ser. No. 17/331,807, filed on May 27, 2021, which claims priority on U.S. Provisional Application Ser. No. 63/033,330, filed on Jun. 2, 2020, all disclosures of which are incorporated herein by reference.

FIELD OF THE INVENTION

The subject technology relates generally to cases for mobile phones, and more particularly to a case that is configured with a compartment to store and provide quick and easy access to a pod that houses sanitizing wipes and may also house a bottle filled with a liquid sanitizer.

BACKGROUND OF THE INVENTION

Many if not most mobile phones are fragile computing devices that suffer serious damage when accidentally dropped, particularly when it falls onto a hard surface like concrete or even a non-carpeted indoor floor. Most screens are still made of glass, and the internal components can suffer damage as well, even when dropped from small heights. For that reason, most cell phone owners purchase and use a case to protect the device, which often costs more than the typical home desktop computer. Durable cell phone cases have therefore become the norm.

Wet wipes have been around since the late 1950s, and have made cleaning up small areas, including one's own hands, very easy and convenient. The individual wet wipe package even became common at many restaurants where a favorite dish involved digging into the entre with both hands, resulting in a need to wash them after eating, such as barbeque ribs, seafood, etc. The outbreak of the Covid-19 virus has created an even greater need to sanitize one hands and certain areas of contact, particularly when away from one's home.

Apart from a person's keys and cash/credit cards, the one item that a person is almost never without is his/her cell phone.

The herein disclosed cell phone case therefore leverages its functionality to furthermore provide a means of supplying a plurality of wet wipes and possible even a sanitizer.

OBJECTS OF THE INVENTION

It is an object of the invention to provide an improved cell phone case.

It is another object of the invention to provide a cell phone case to protect a person's cell phone.

It is a further object of the invention to provide a protective case for a cell phone that also functions to store a plurality of wet wipes therein in a leak proof manner.

It is another object of the invention to provide a protective case for a cell phone that also functions to store a plurality of wet wipes that may be quickly and easily accessed, one at a time.

It is also an object of the invention to provide a protective case for a cell phone that also stores a container of wet wipes.

It is another object of the invention to provide a protective case for a cell phone that also stores a container of wet wipes that may be quickly and easily removed and replaced with another such container of wipes.

It is also an object of the invention to provide a protective case for a cell phone that also functions to store a bottle of a liquid sanitizer.

It is another object of the invention to provide a protective case for a cell phone that also store a spray bottle of a liquid sanitizer.

It is also an object of the invention to provide a protective case for a cell phone that also stores a bottle of a liquid sanitizer that may be quickly and easily removed and replaced with another such bottle.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with at least one embodiment, a mobile phone case may broadly include a housing in which a detachable and refillable pod is inserted within a compartment. The removable and refillable pod holds disinfectant and sanitizing wet wipes. The disinfectant sanitizing wipes may be used for, but not limited to, cleaning the phone, the phone case, the person's hands, other objects, and/or various surfaces. In addition to the phone case's internal compartment being used for attaching the sanitizing pod, the pod may also be attached outside the phone case and specifically on the back of the phone case. The phone case's internal compartment may also carry various forms of disinfectant substances within its specific case/pod including but not limited to sanitizing liquid, antimicrobial gel, ethyl alcohol gel, disinfectant gel, alcohol wipes, sanitizing towels, disposable wipes, surface wipes, screen wipes, disinfectant towels, and microfiber cloths and any other substance which helps reduce bacteria on any surface and hands. Fluid substances used for cleaning purposes of surfaces may also be attached outside or within the phone case's compartment. The sanitizing wipes that are detachable from the phone case have absorbency qualities, adhesion to polyester or polypropylene, and the exposure to lotions, perfume, and softeners may also occur. Hygienic materials in the form of liquid, tissue products, or disinfectant sprays may also be inserted to or within the phone case. Note that the sanitizing materials which will be inserted and detached from or within the phone case may provide biodegradable properties and environmentally friendly substances. The refillable pod/case which will host various sanitizing qualities may also be used to clean eating utensils (silverware), glasses, plates at restaurants, bars, and all recreational places. In such a case, natural ingredients such as lemongrass oil and no alcohol will be used. Such sanitizing wipes and gel may also be used to clean plates, bowls, cups, or soda can tops, etc. While the primary use for the sanitizing wipes and gel is for cleaning and disinfecting the phone, phone screen, phone case, hands, and surfaces, the manufacturing substances of the wipes will vary in form based on the customer's desire and use of the sanitizing wipes.

The phone case's internal compartment will be used to insert and remove the refillable sanitizing pod and any other sanitizing gel or liquid which will be used by the user. The phone case will comprise of the phone case in which the phone attaches, an internal compartment in which any form of disinfecting, sanitizing wipes, disinfecting gel and or any other form of hygienic substance and material will be inserted. Replaceable pod:

The interior of the pod will be filled with, primarily, flexible and stretchable anti-pull wipes that are suitable for cell phone and skin hygienic. The detachable pod will consist of a hard plastic base with which it will attach within or outside the phone case itself. The rest of the pod will consist of flexible plastic in which the wipes are encased. The pod's top part, apart from the typical plastic material will include an easy-to-use peel back entry point where the wipes will be removed from. The entry point will be simply resealed by having the individual's thumb running firmly over the label. The overall pod may have approximate dimensions of 2.5 inches wide by 3.5 inches long and a 0.25 inch overall thickness (refer to appropriate drawings for more information on dimensioning). The pod will be inserted at the back of the phone case. The back of the phone case opens via a sliding action where the user, when looking at the back of the phone slides a covering to the right to reveal a cavity within the phone case where the pod will reside.

The instructions for inserting the pod are as follows: On the back of the upper-left corner of the phone case, put the tip of your index finger in the seam between the plastic (silicone) frame and the back cover. Press the middle of the back cover, bend the cover open, and insert it. The use of any sharp tools is highly discouraged as this may damage the phone case, the phone itself, the pod, and the mechanisms associated with it.

The mechanism of the phone case and the pod work together to ensure the pod is secured and locked in position inside the case. It will also ensure that the pod can only be inserted in a single orientation for proper fitment. The mechanism is operated via a receiver and giver mechanism, with the receiver on the inside of the phone case and the giver on the outside the pod respectively. To remove the pod, simply follow the instructions by removing the pod out and sliding the case to the left to secure the opening.

The pod is secured within an independent compartment that consists of the back half of the phone case. This rear compartment is separate from the area with which the phone is secured.

The rear compartment is accessed by a sliding cover that takes up the majority of the case's width. The rear compartment cover slides to the right to open and has a tab within to secure it in place when closed.

Another version of the case includes not only a replaceable pod but also a space for a sanitizing spray/gel dispenser.

Sanitizing and disinfectant materials may also be inserted within the Pod via a clip mechanism. The wipes inserted within the case may also be released from the pod by a zipper mechanism. The phone case may also include a front flap in which the disinfectant material can be released in the front of the phone case through a pocket holder mechanism. The mechanism will be able to clip on and off on the front side, back side and the side. The sanitizing mechanism will be able to demonstrate to the consumer how many sanitizing wipes are left.

BRIEF DESCRIPTION OF THE DRAWINGS

The description of the various example embodiments is explained in conjunction with appended drawings, in which:

FIG. 2 is a top view of the phone case embodiment shown in FIG. 1;

FIG. 3 is an end view of the phone case embodiment shown in FIG. 1;

FIGS. 13A-13D are a front view, end view, rear view, and a third perspective view of the wipe container and installation structure of the pod version shown in FIG. 10;

FIG. 25 is a first perspective view of a third pod embodiment that is configured to releasably secure to the housing using a hinge arrangement;

FIG. 26 is a second perspective view of the pod embodiment shown in FIG. 24;

FIG. 27 is a front view of the pod embodiment shown in FIG. 24;

FIG. 28 is an end view of the pod embodiment shown in FIG. 24;

FIG. 29 is an exploded view of another case embodiment and a corresponding container that is configured to releasably attach to the case and to store a plurality of wipes;

FIG. 30 is a perspective view of the case and container of FIG. 29, shown as the container is being releasably coupled to the back of the case;

FIG. 31 is a perspective view of the case and container of FIG. 29, shown after the container has been releasably coupled to the back of the case;

FIG. 38 is a perspective view showing another pod embodiment just prior to being magnetically coupled within the rear compartment of another case embodiment;

FIG. 39 is a perspective view showing the pod embodiment of FIG. 38, just after being magnetically coupled within the rear compartment of the case embodiment of FIG. 38;

FIG. 40 is a transparent perspective view showing yet a different pod embodiment, being shown just after being magnetically coupled directly to a user's cell phone;

FIG. 41 is a second perspective view of the pod embodiment of FIG. 40 after being magnetically coupled directly to a user's cell phone;

FIG. 42 is a first exploded view of the component parts of the pod embodiment of FIG. 40;

FIG. 43 is a second exploded view of the component parts of the pod embodiment of FIG. 40;

DETAILED DESCRIPTION OF THE INVENTION

Figure 1:
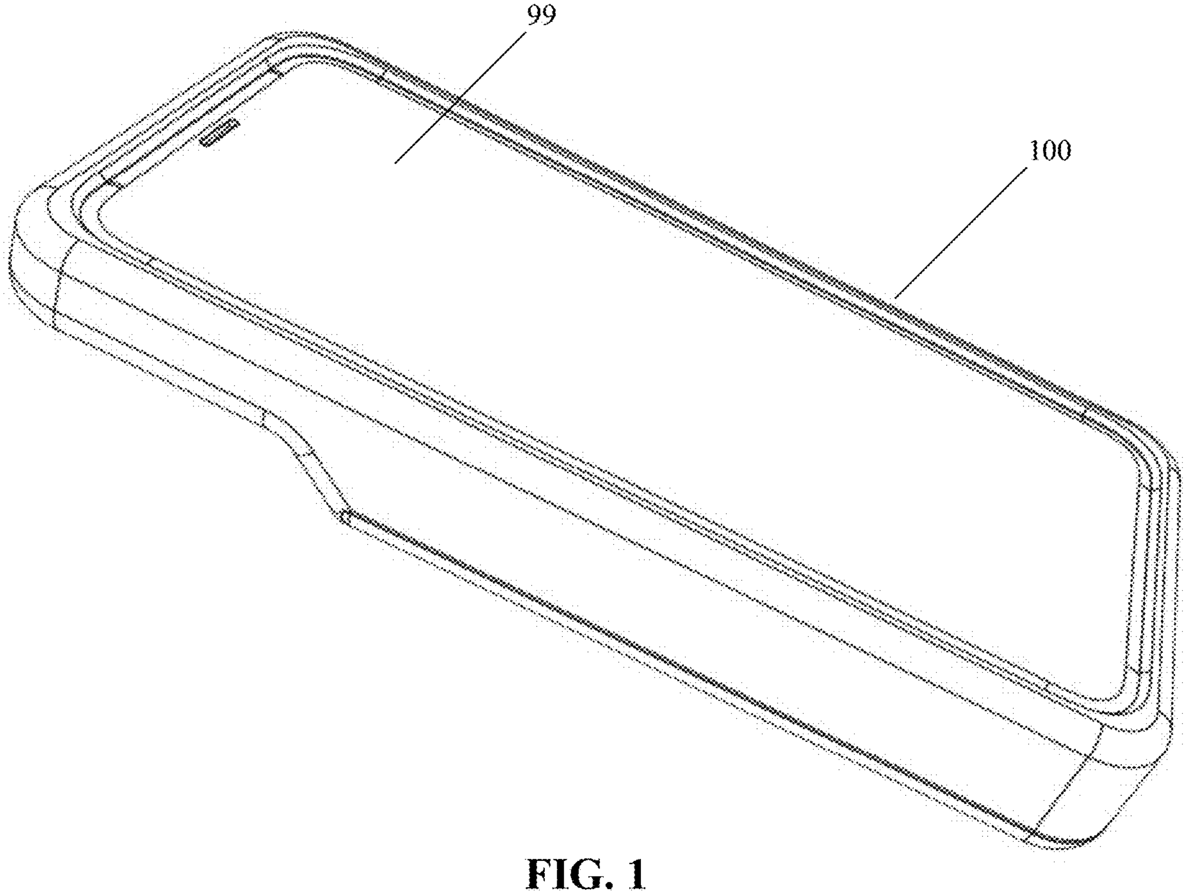
FIG. 1 is a perspective view of a first embodiment of a phone case as disclosed herein, shown after a cell phone is releasably received therein.

As used throughout this specification, the word "may" is used in a permissive sense (i.e., meaning having the potential to, or being optional), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, It is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variations resulting from a stack up (i.e., the sum) of a multiplicity of such individual tolerances.

Any use of a friction fit (i.e., an interface fit) between two mating parts described herein indicates that the opening (e.g., a hole) is smaller than the part received therein (e.g., a shaft), which may be a slight interference in one embodiment in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other values for the interference may also be used in different configurations (see e.g., "Press Fit Engineering and Design Calculator," available at: www.engineersedge.com/calculators/machine-design/press-fit/press-fit-calculator.htm).

Any described use of a clearance fit indicates that the opening (e.g., a hole) is larger than the part received therein (e.g., a shaft), enabling the two parts to move (e.g. to slide and/or rotate) when assembled, where the gap between the opening and the part may depend upon the size of the part and the type of clearance fit—i.e., loose running, free running, easy running, close running, and sliding (e.g., for a 0.1250 inch shaft diameter the opening may be 0.1285 inches for a close running fit, and may be 0.1360 inches for a free running fit; for a 0.5000 inch diameter shaft the opening may be 0.5156 inches for a close running fit and may be 0.5312 inches for a free running fit). Other clearance amounts are used for other clearance types. See "Engineering Fit" at: https://en.wikipedia.org/wiki/Engineering_fit; and "Three General Types of Fit," available at www.mm-to.org/dclark/Reports/Encoder %20Upgrade/fittolerences %20%5BRead-Only %5D.pdf.

The terms "rigid," and "flexible," and "resilient" may be used herein to distinguish characteristics of portions of certain features of the case and pod disclosed herein. Use of the term "rigid" indicates that the described element is devoid of flexibility such that it does not readily lose its overall shape when force is applied by hand, and in fact it may break if an attempt to bend it is made with sufficient force. Use of the term "flexible" indicates that the described element is capable of repeated bending such that it may be bent into different shapes and does not retain a general shape, but instead readily deforms when force is applied. Use of the term "resilient" indicates that the described element has such flexible features and also has a tendency to return to its initial general shape without permanent deformation once a force that causes such flexure is removed. Use of the term "semi-rigid" indicates that the described element may have some degree of flexibility or some degree of resiliency.

As used herein, the term "hand-held" describes an item, at least one part of which is easily and conveniently handled in an average-sized human hand. Preferably, this term indicates that the entire item has an ergonomic size, weight, and shape which makes it easy to comfortably hold in the hand, during use.

As used herein, the term "waterproof" indicates that unless opened, broken, cracked, etc., the item or barrier is substantially impervious to water inadvertently entering into or exiting out from the interior area of the item or passing through the barrier, during normal use. This term does not encompass any water which is specifically added, or desirably added into the interior of the item.

Moreover, as used herein, the term "smart phone" refers to any phone and/or phone tablet and/or smart phone pad and/or any similar device that is configured to run applications and is able to interface with the World Wide Web via wireless or wired communication and further communicates with other such devices via wireless or wired communication interfaces.

FIGS. 1-3 show various views of a cell phone case assembly 100, as disclosed herein, which case assembly is configured to house and protect a cell phone 99 in cavity therein.

Figure 8:
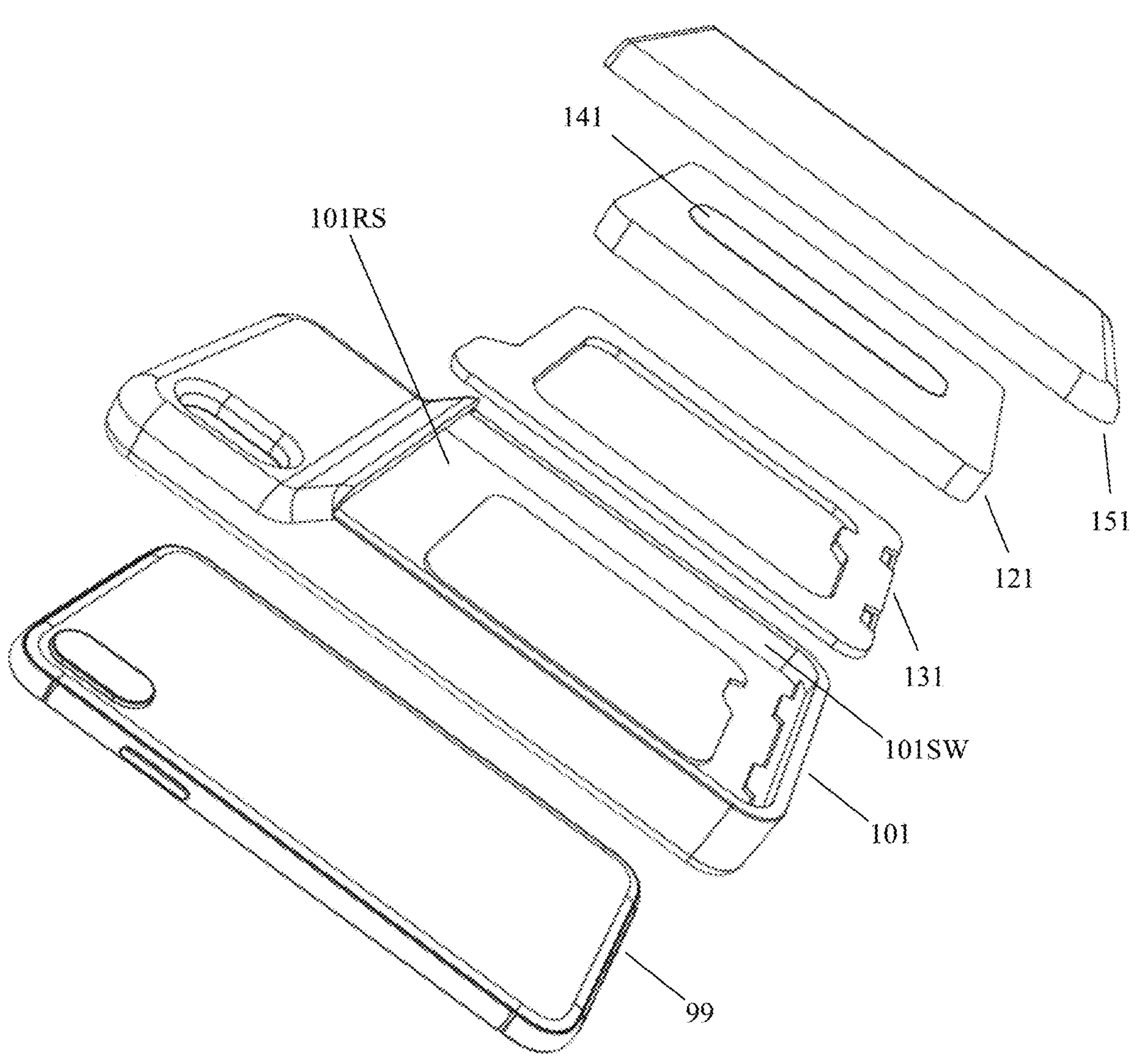
FIG. 8 is a first exploded view of the component parts of the phone case of FIG. 1, and also an exemplary cell phone that may be stored in the case.
Figure 9:
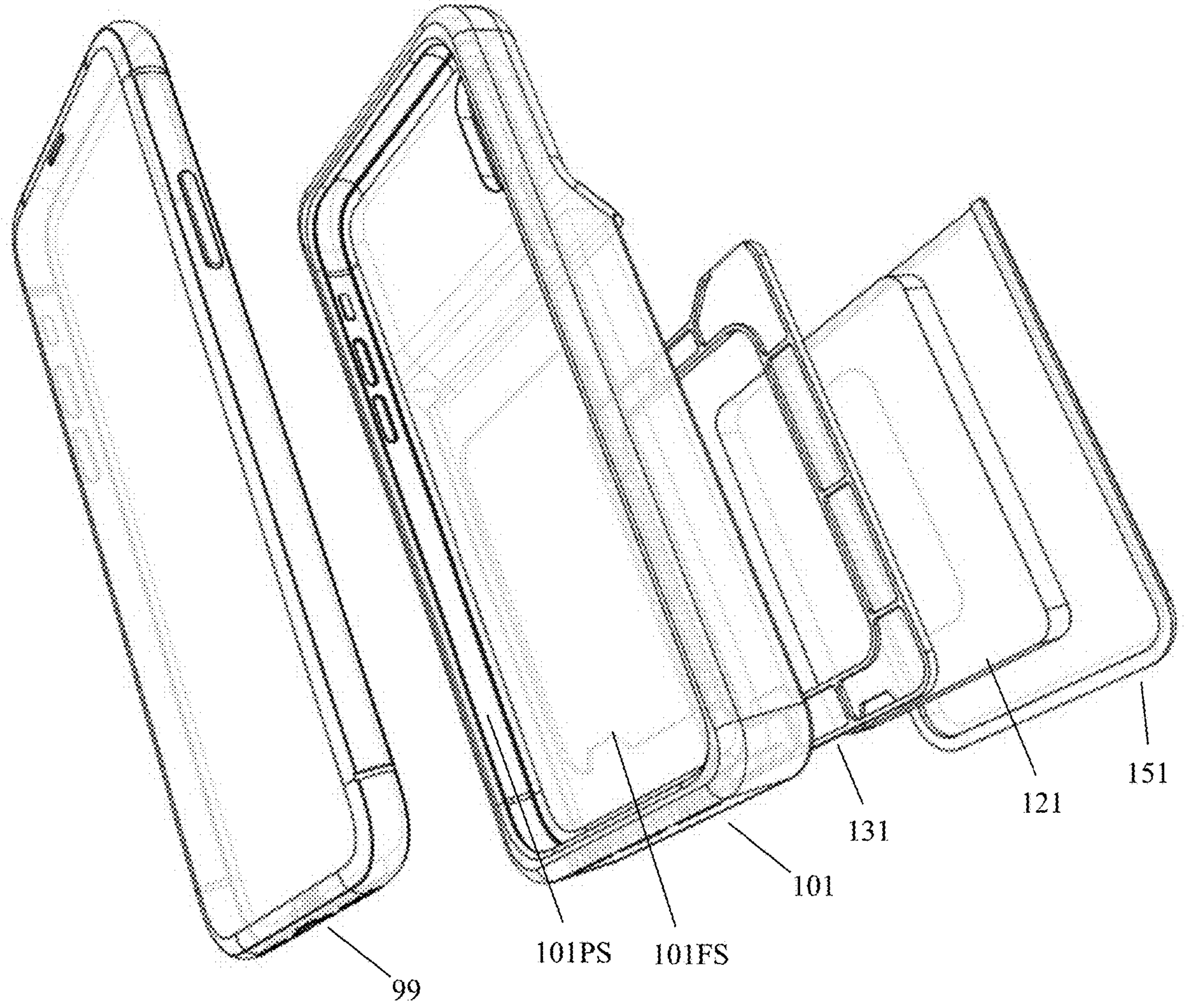
FIG. 9 is a second exploded view of the component parts of the phone case of FIG. 1, and also an exemplary cell phone that may be stored in the case.

As shown in FIG. 8 and FIG. 9, the case assembly 100 that houses the cell phone 99 may be formed to include a housing 101, a container portion 121, a backing portion 131, and a cover 151.

As seen in FIG. 9, the housing 101 may be formed to include a first opening defining a front wall surface 101FS, and a peripheral wall surface 101PS, which may form a first housing cavity. The front wall surface 101FS may contact and support the rear of the cell phone 99, and the peripheral wall surface 101PS may contact and support at least the four sides of the cell phone to retain it in the first housing cavity. In one embodiment, a majority portion of the peripheral wall surface 101PS may be formed to be substantially perpendicular to the front wall surface 101FS, which may be substantially flat. The peripheral wall surface 101PS may also wrap around to form a small lip that may contact a small portion of the front of the cell phone 99, so that the cell phone may need to expand (i.e., elastically deform) the peripheral surface slightly, to snap into the first housing cavity.

As seen in FIG. 8, the housing 101 may also be formed to include a second opening defining a rear wall surface 101RS and a side wall surface 101SW, to form a second housing cavity. The second housing cavity may be configured to receive and house a pod that stores a plurality of wipes 98. In one embodiment a majority portion of the side wall surface 101SW may be substantially perpendicular to the rear wall surface 101RS, which may be substantially flat.

Figure 34:
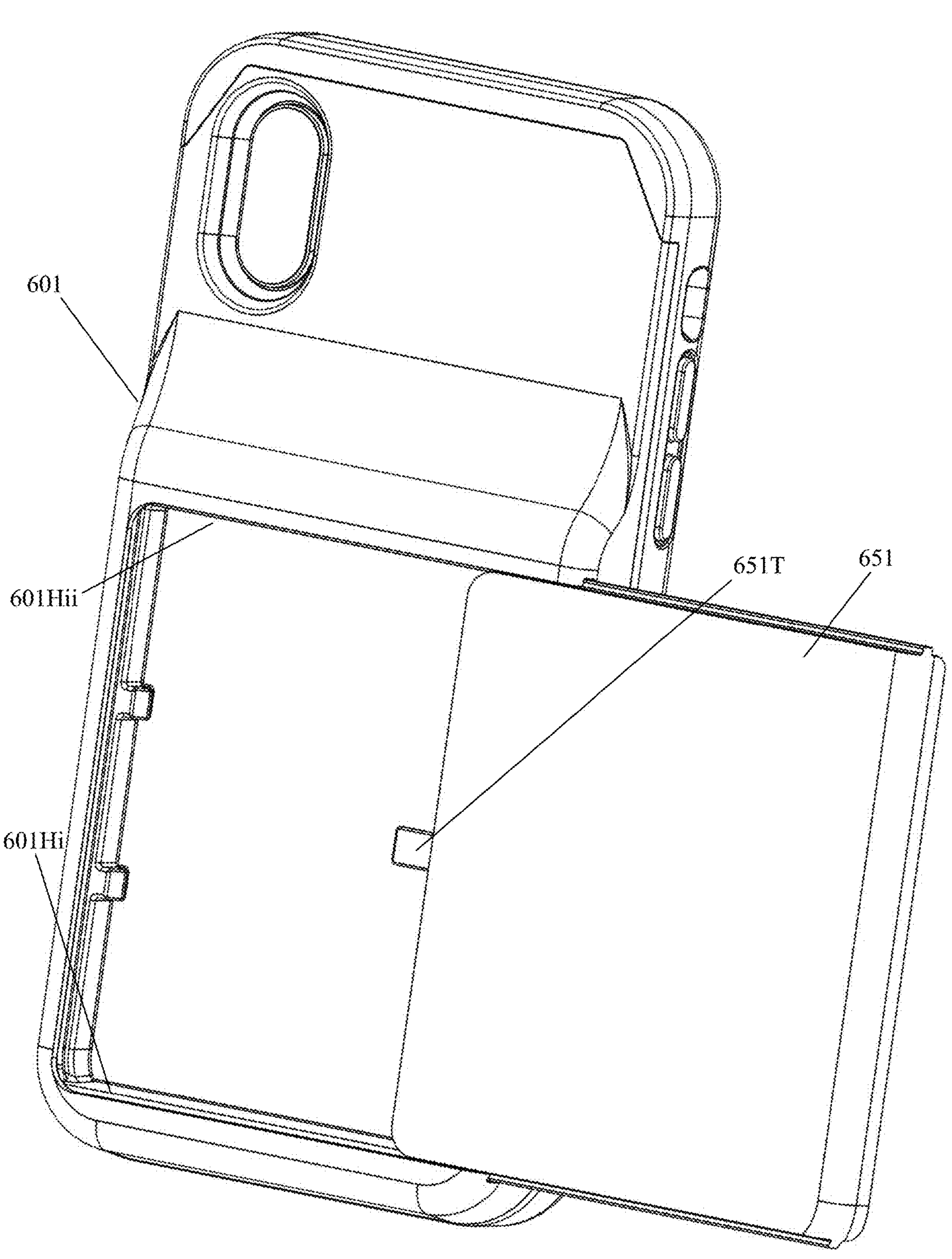
FIG. 34 is a perspective view of another phone case housing and rear cover.

The housing 101 may also be formed to include a number of openings to accommodate access to buttons on the cell phone, a speaker outlet, and other such features (see e.g., FIG. 3 and FIG. 34).

Figure 10:
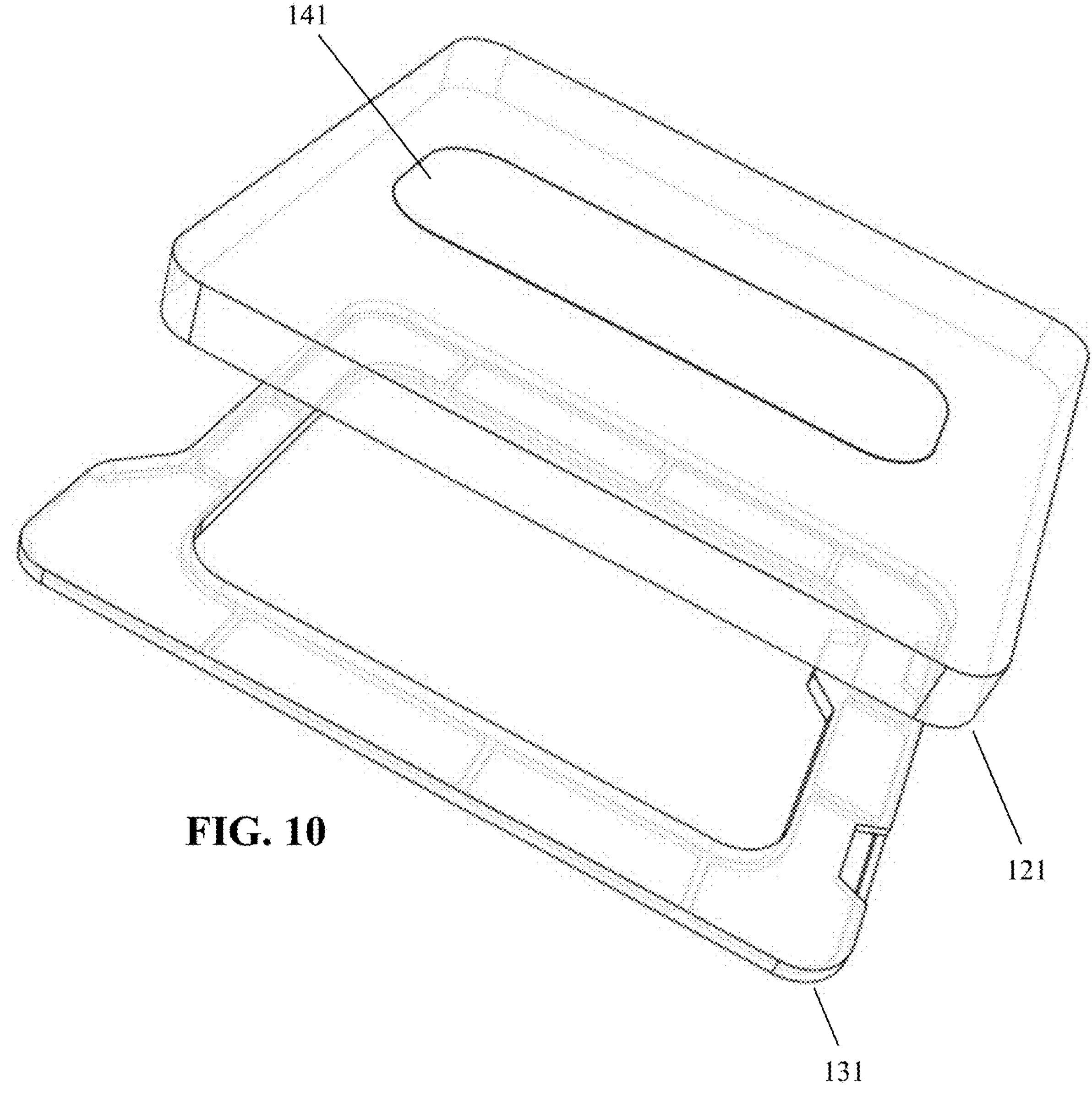
FIG. 10 is an exploded view of one version of a pod that may be secured in a compartment of the phone case embodiment of FIG. 1, and which pod version is formed of a wipe container and backing structure.
Figures 11, 12:
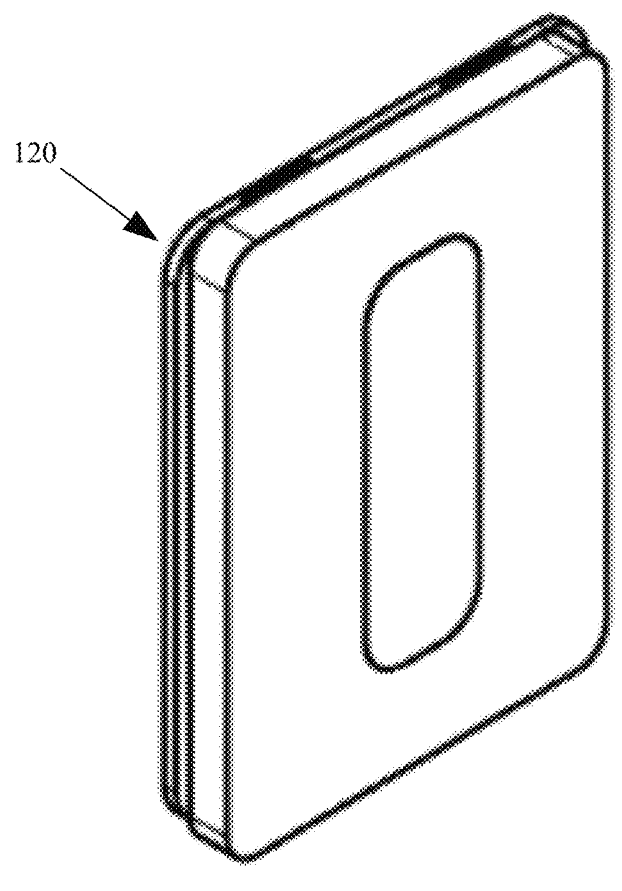
FIG. 11 is a first perspective view of the wipes container and installation structure of the pod version shown in FIG. 10, being shown coupled together.
FIG. 12 is a second perspective view of the wipes container and installation structure of the pod version shown in FIG. 10.
Figures 14, 15:
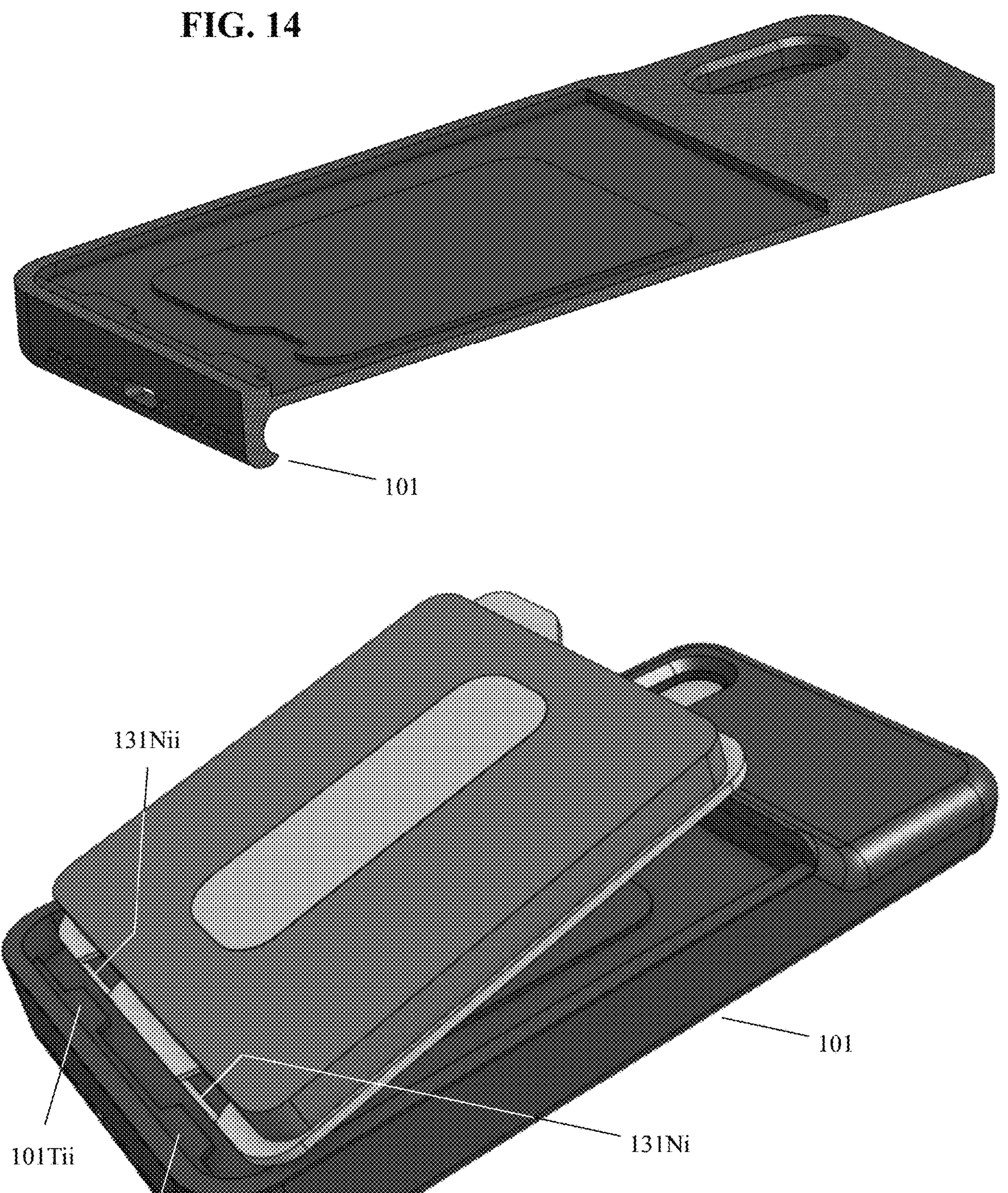
FIG. 14 is a perspective view of the rear of the case of FIG. 1, shown with the rear cover removed to expose the rear compartment.
FIG. 15 is the perspective view of FIG. 14, shown with the pod being initially installed in the rear compartment of the case housing.
Figure 16:
FIG. 16 is the perspective view of FIG. 15, but shown with only the installation structure of the pod of FIG. 11 being initially inserted into the rear compartment of the case housing.
Figure 17:
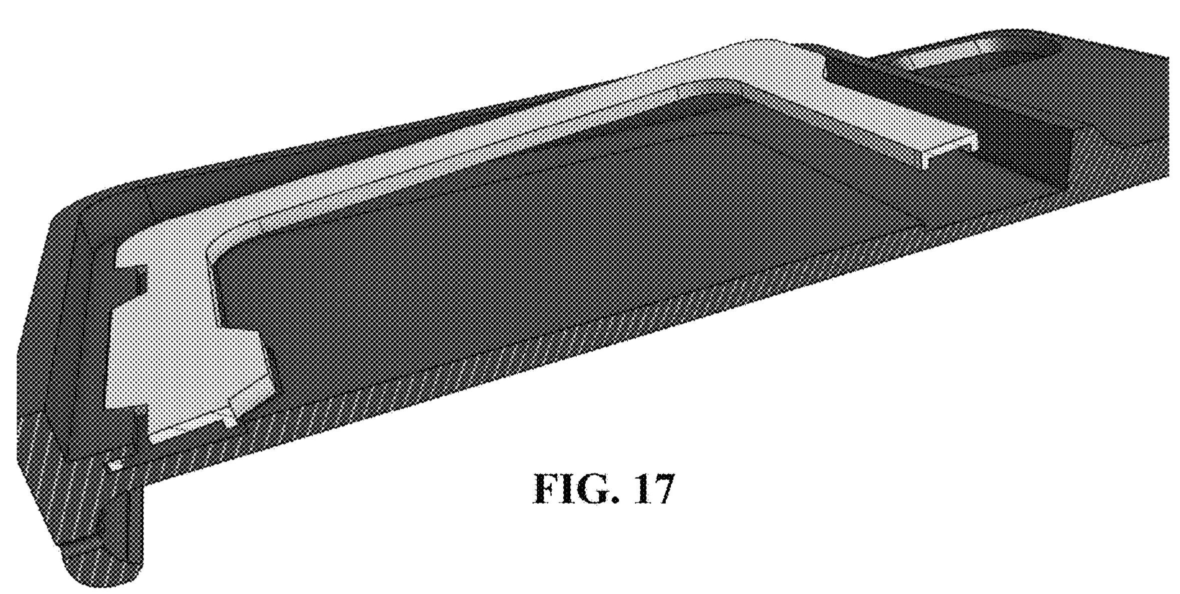
FIG. 17 is a first cut-away perspective view showing the installation structure of the pod being initially installed in the rear compartment of the case housing.
Figure 18:
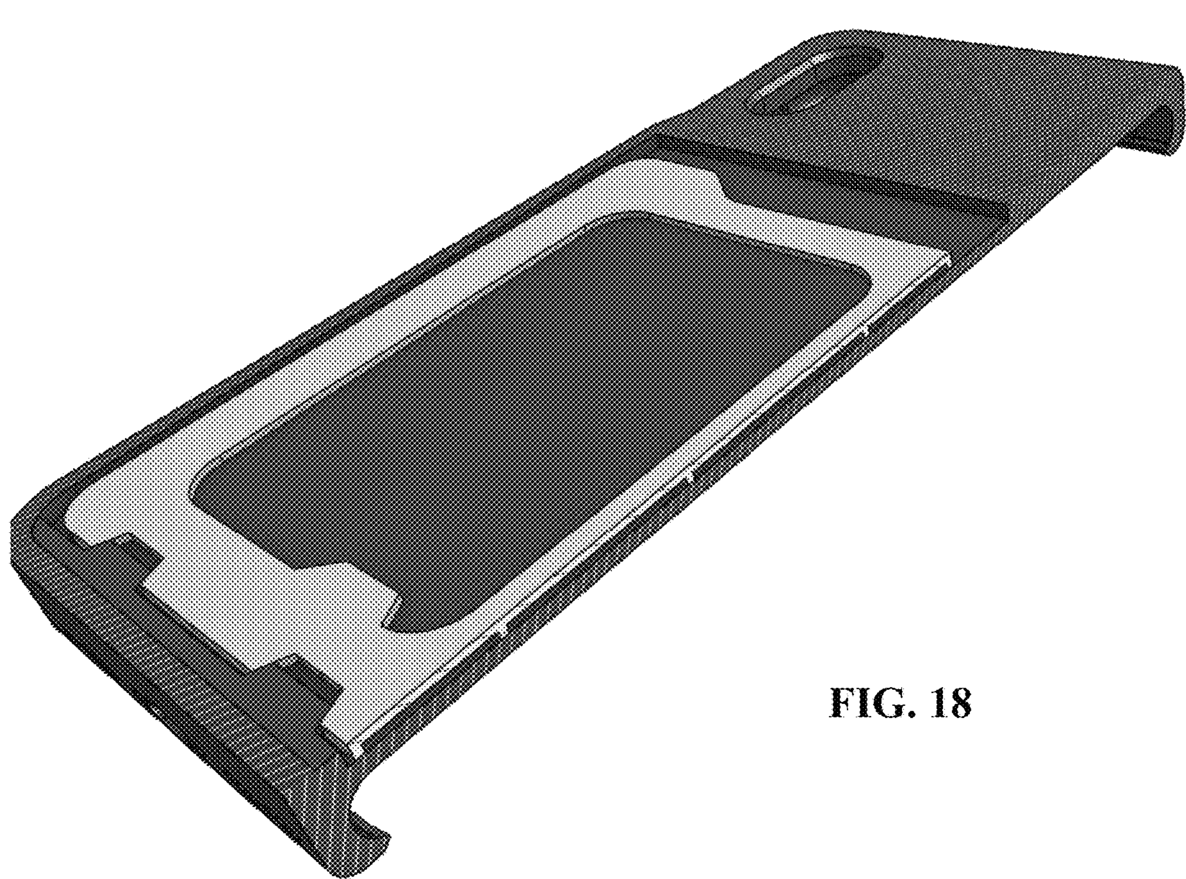
FIG. 18 is a second cut-away perspective view showing the installation structure of the pod after being installed in the rear compartment of the case housing.
Figure 19:
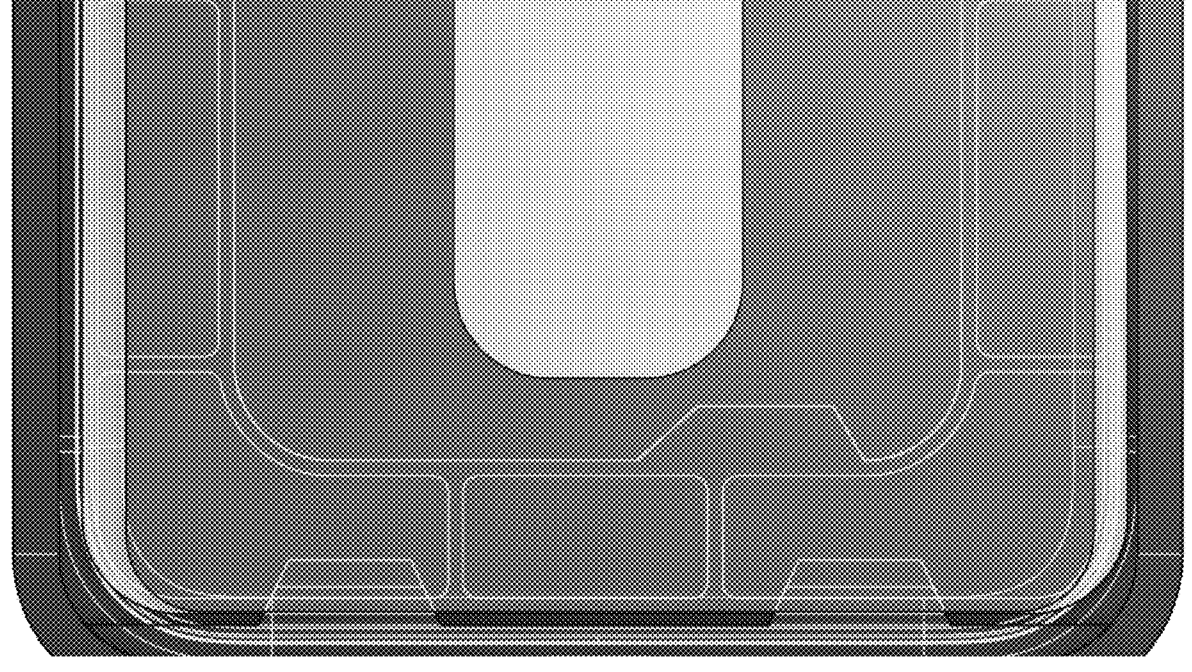
FIG. 19 is a rear view showing the pod after being installed in the rear compartment of the case housing.
Figure 20:
FIG. 20 is a rear perspective view showing the rear cover being slidably joined to the case housing.

As seen in FIGS. 8, 9, and 10, a first embodiment of the pod 120 may be formed of a container portion 121, and a backing portion 131, both of which may be releasably joined together using a re-sealable adhesive or adhesive strips (see FIG. 33), or may be fixedly secured together (e.g., by friction welding). In another embodiment, the pod 120 may be formed of a single unitary part that may include the significant features of each of the container portion 121 and the backing portion 131, which features are described hereinafter. A strip 141 may be used in combination with any pod embodiment disclosed herein.

Figures 21A, 21B, 21C, 21D, 21E, 21F:
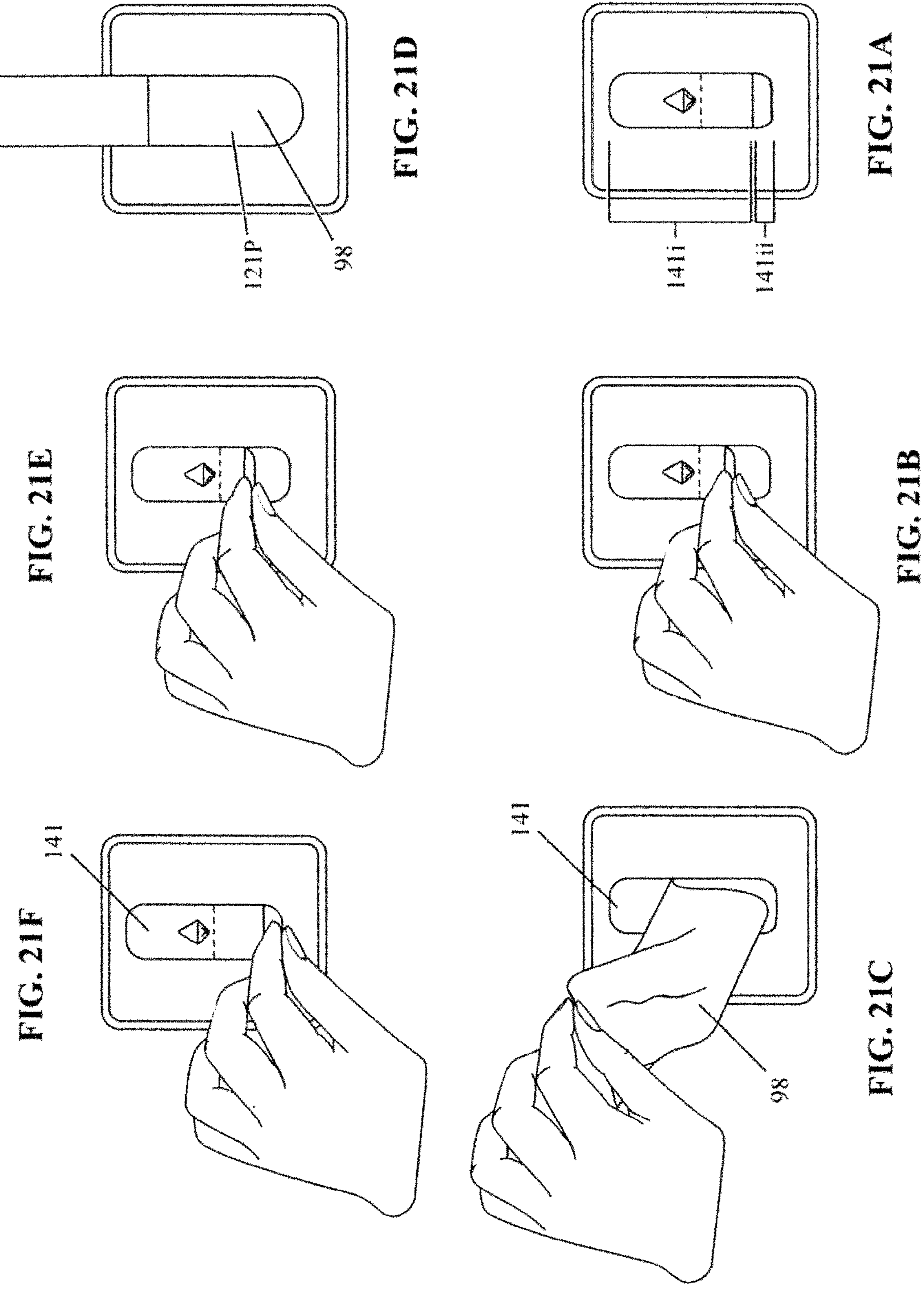
FIG. 21A-21F are a series of views showing an adhesive strip in the process of being sealed with respect to the container to store wipes therein in a leak-proof manner, and in the process of being unsealed to permit removal of wipes through an opening in the container.

The individual container portion 121 and backing portion 131 of pod 120 are shown in detail in FIGS. 10, 11, 12, and 13A-13D. The container portion 121 may be formed to include an elongated opening 121P (FIGS. 13A and 21D) into a cavity that is configured to house a plurality of sanitizing wipes. The wipes may be sequentially pulled through the elongated opening 121P one at a time (see FIG. 21C).

The strip 141 may be formed to have a first portion 141*i* and a second portion 141*ii*. The first portion 141*i* of the strip 141 is sized to cover and extend beyond a periphery of the elongated opening 121P, and also has a resealable adhesive on one side, to thereby be configured to releasably adhere to the container portion 121 to seal the elongated opening 121P when in contact with the container portion, to house the sanitizing wipes in a waterproof manner. The second portion 141*ii* of the strip 141 is configured to be grasped to unseal (FIGS. 21B-21C) and to reseal (FIGS. 21E-21F) the first portion of the strip with respect to the container portion.

Figure 4:
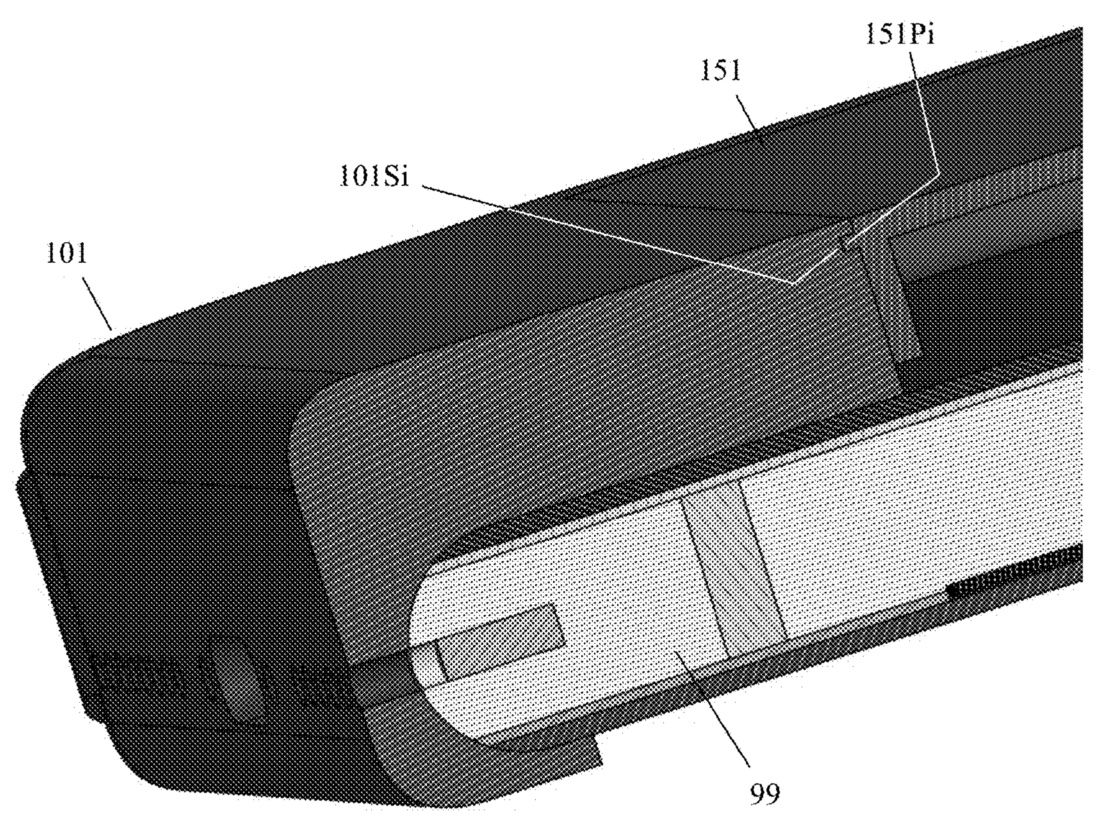
FIG. 4 is a cut-away perspective view of the phone case embodiment shown in FIG. 1.
Figure 7:
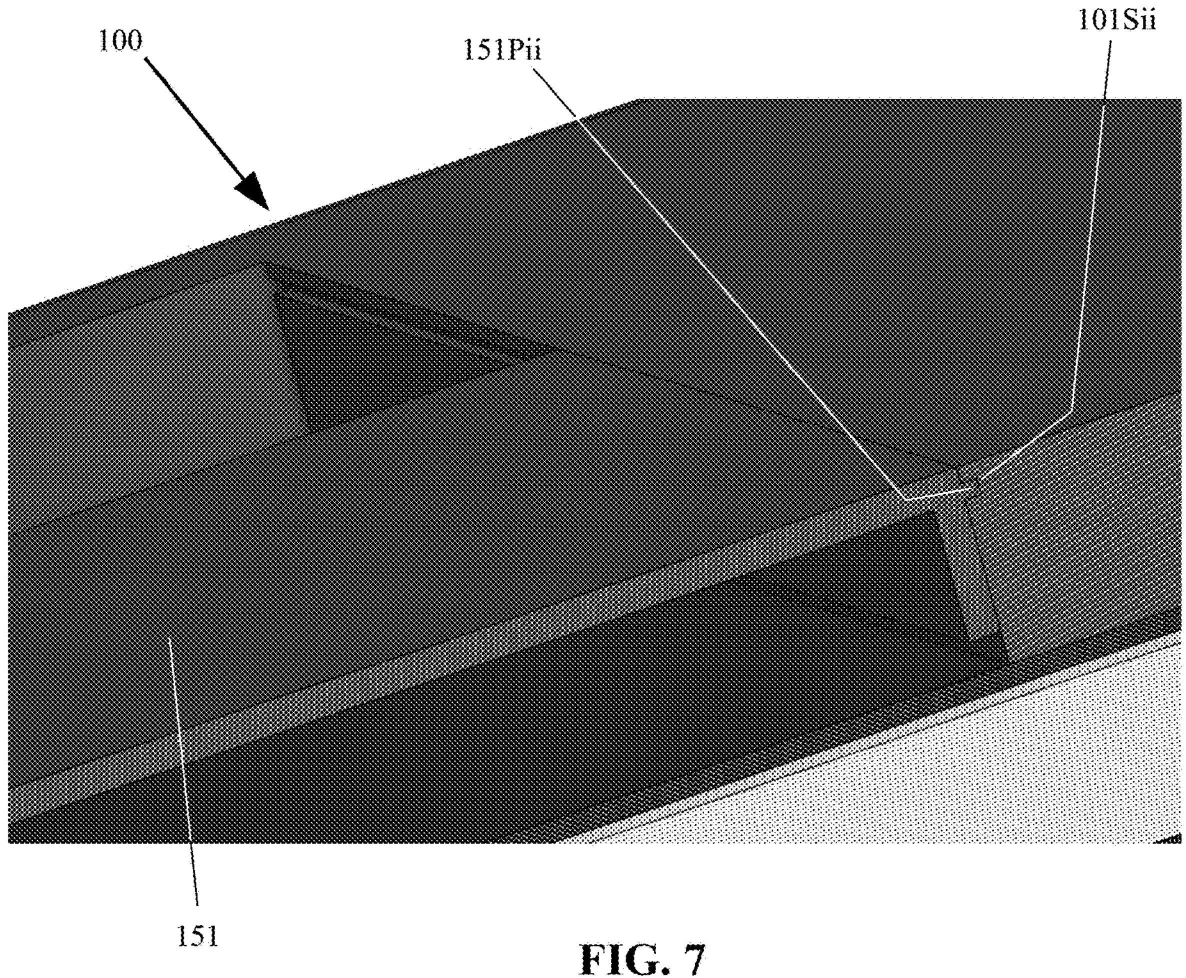
FIG. 7 is the cut-away perspective view of FIG. 4, but shown enlarged and without the phone being retained therein.

As seen in FIG. 4 and FIG. 7, the housing 101 may also be formed to include a first slot 101Si, and a second slot 101Sii; and the cover 151 may be formed with a first protrusion 151Pi and a second protrusion 151Pii, whereby the first slot 101Si and the second slot 101Sii are configured to slidably receive the first and second protrusions 151Pi/151Pii, respectively, to couple the cover to the housing. The first slot 101Si and the second slot 101Sii may be configured to slidably receive the first and second protrusions 101Pi/101Pii, respectively, in a clearance fit, or in a friction fit to better secured the cover 151 to the housing 101 without the use of a cover latch. A cover latch may nonetheless be utilized, and is a feature of another embodiment disclosed hereinafter.

In one embodiment, the pod 120 may only be retained in the second housing cavity through use of the cover 151 being coupled to the housing 101. Therefore, the cell phone owner, when wipes are needed, may remove the cover and may remove the pod 120 and withdraw as many wipes as needed.

Figure 5:
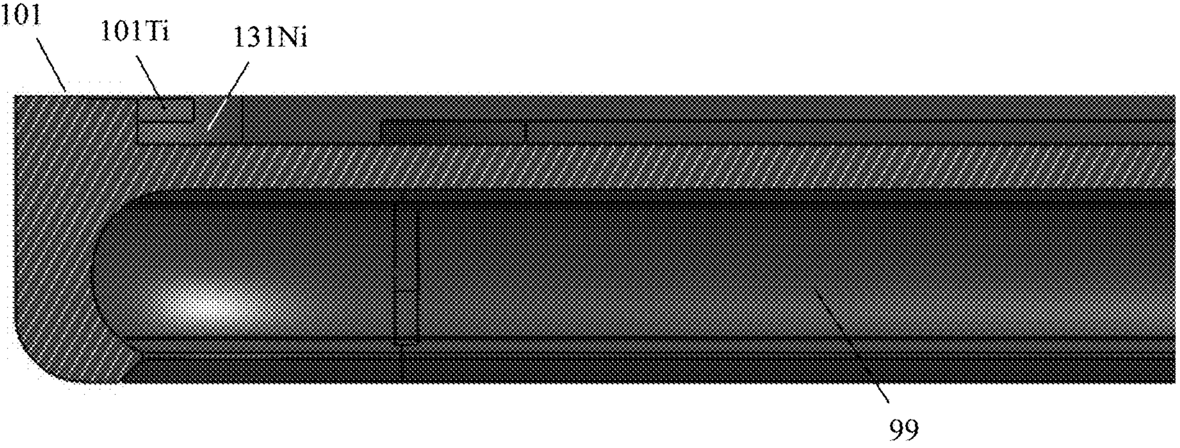
FIG. 5 is a cross-sectional view through the phone case embodiment shown in FIG. 1.
Figure 6:
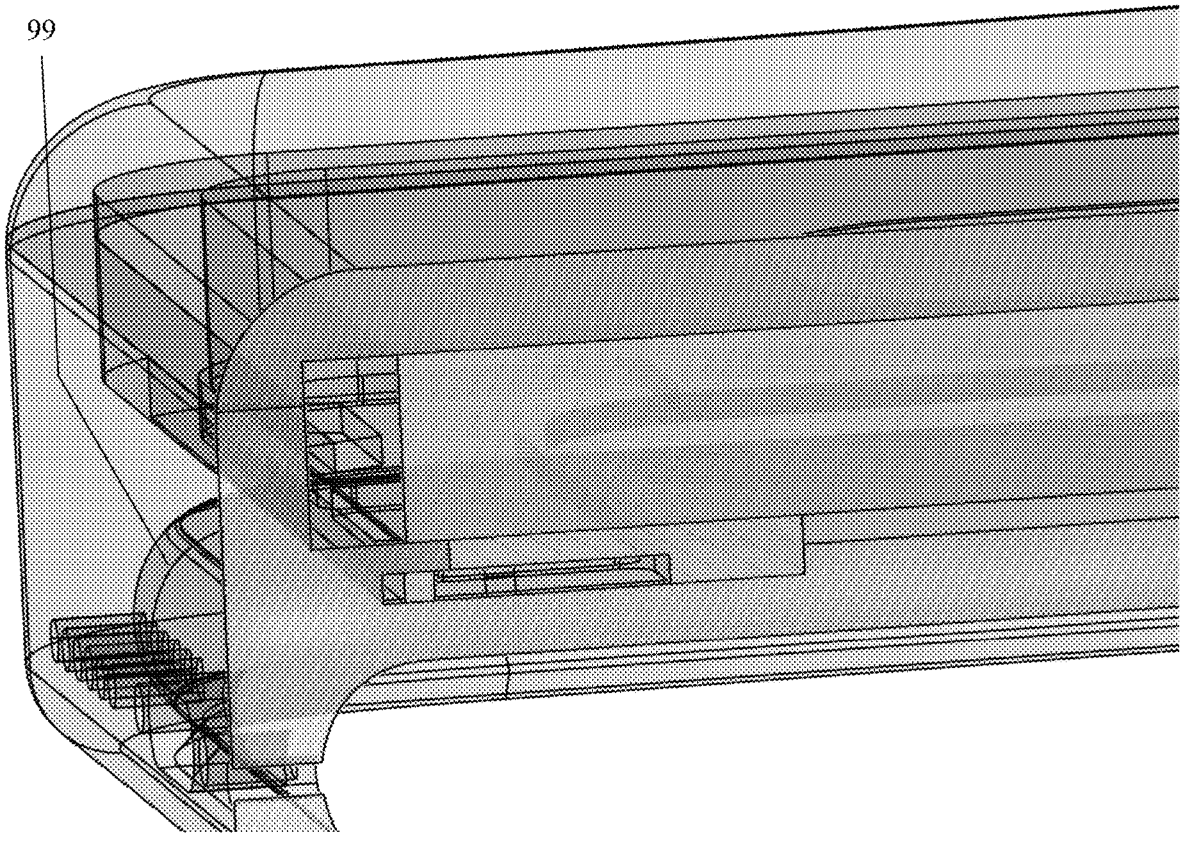
FIG. 6 is a transparent cut-away perspective view of the phone case embodiment shown in FIG. 1.
Figure 22:
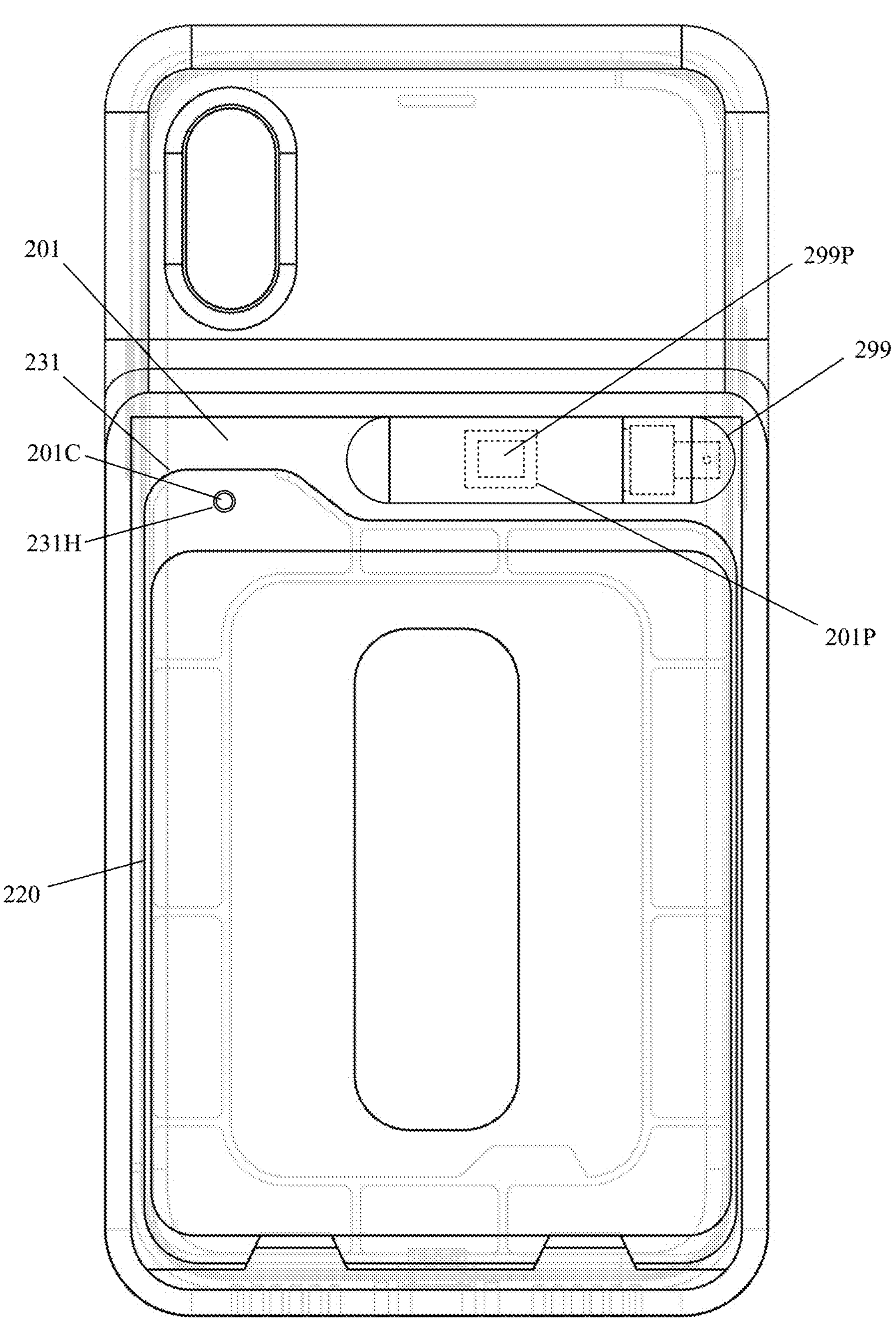
FIG. 22 is a rear view showing a second case embodiment, which is also configured to house a spray bottle filled with a liquid sanitizing solution.

In another embodiment, it may be more convenient for the cell phone owner if the pod 120 is releasably retained in the second housing cavity even after the cover 151 has been uncoupled from the housing 101, permitting removal of wipes without having to hold onto the pod 120. Such releasable coupling of the pod 120 within the second housing cavity may be accomplished using one or more of several different structural arrangements. For example, as seen in FIGS. 15, 16, 17, and 18, the housing 101 may be formed to include at least one tab (e.g., tab 101Ti and/or 101Tii) that is shaped to protrude into a particular position in the second housing cavity; while the pod 120 (e.g., the backing portion 131) may be formed to include at least one necked down portion (e.g., necked down region 131Ni and/or 13Nii—see FIG. 13C), where the necked down portion may be sized and positioned to slide and nest between the at least one tab and the rear wall surface (see FIG. 5). In one embodiment the necked down portion may be slid/nested between the at least one tab and the rear wall surface using a clearance fit. In another embodiment, a friction fit may instead be used to releasably secure the pod to the housing. In yet another embodiment, the necked down portion may transition into a respective recess or an opening (e.g., 131Pi and/or 131Pii) that may receive a correspondingly shaped portion of the protrusion therein, which protrusion may therefore be "L"-shaped, with the short leg of the "L" shape being received in the recess/opening. The necked down regions 131Ni/13Nii and the corresponding recesses/openings 131Pi/131Pii may be spaced apart to provide better support for the pod 120, and may be positioned on one side of each of the housing and the backing portion. The opposite side of the backing portion 131 may contact the opposite side of the second housing cavity in a friction fit. Additionally, or alternatively, the opposite side of the pod 120 may be secured within the housing cavity using an additional structural attachment. For example, as shown in FIG. 22, one or more protrusions 201C, which may be cylindrical, may protrude into the second housing cavity of housing 201, and may be respectively received within one or more corresponding holes 231H that may be formed in the backing portion 231. Each cylindrical protrusion 101C may be received in the corresponding hole 131H in a clearance fit, or more preferably may be received in a friction fit.

In yet another embodiment, the pod 220 may be contoured to permit a spray bottle 299 to be stored in the second housing cavity, which spray bottle may hold a disinfecting liquid, or sanitizer. The housing 201 may have fixedly secured thereto a piece of material 201P, being either a piece of hook type material or the corresponding loop type material to which the hook type material can be releasably attached—which hook and loop materials are descriptive names for such materials that are sold under the trademark VELCRO®. The spray bottle 299 may have secured thereto a piece of material 299P being the other of the hook/loop materials, to releasably secure the spray bottle to the housing 201 within the second housing cavity.

Figure 23:
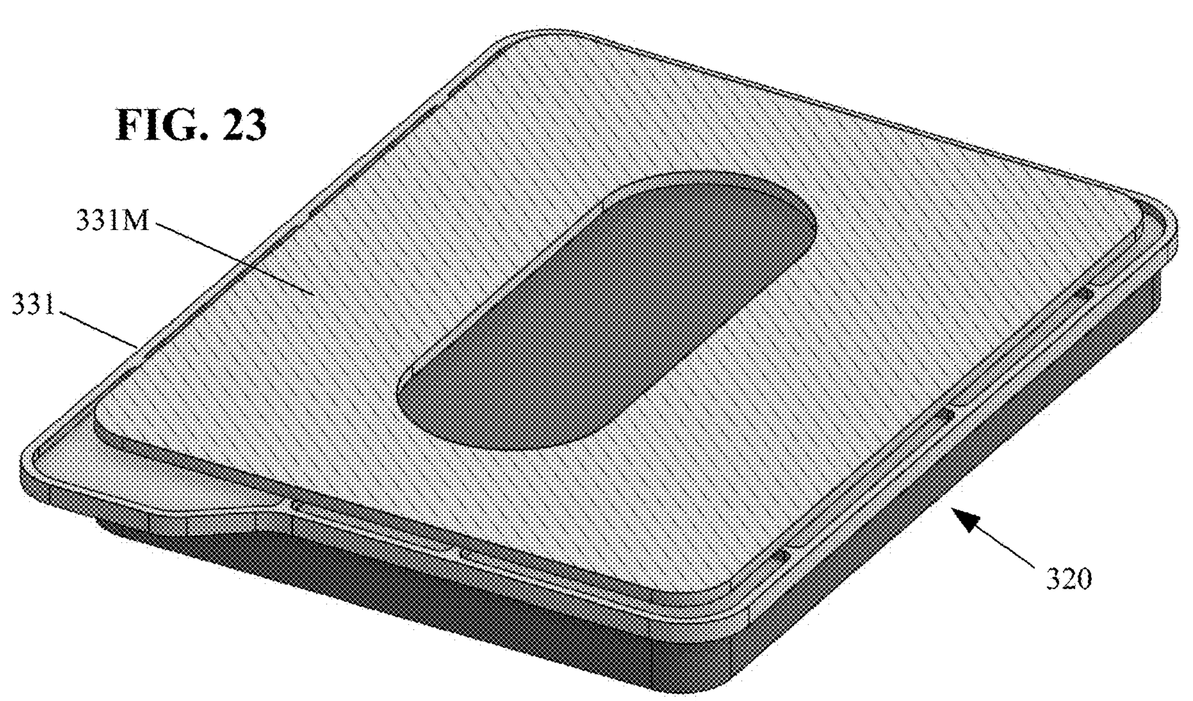
FIG. 23 is a perspective view of a second pod embodiment that is configured with a magnet to releasably secure to the housing using magnetism.
Figure 24:
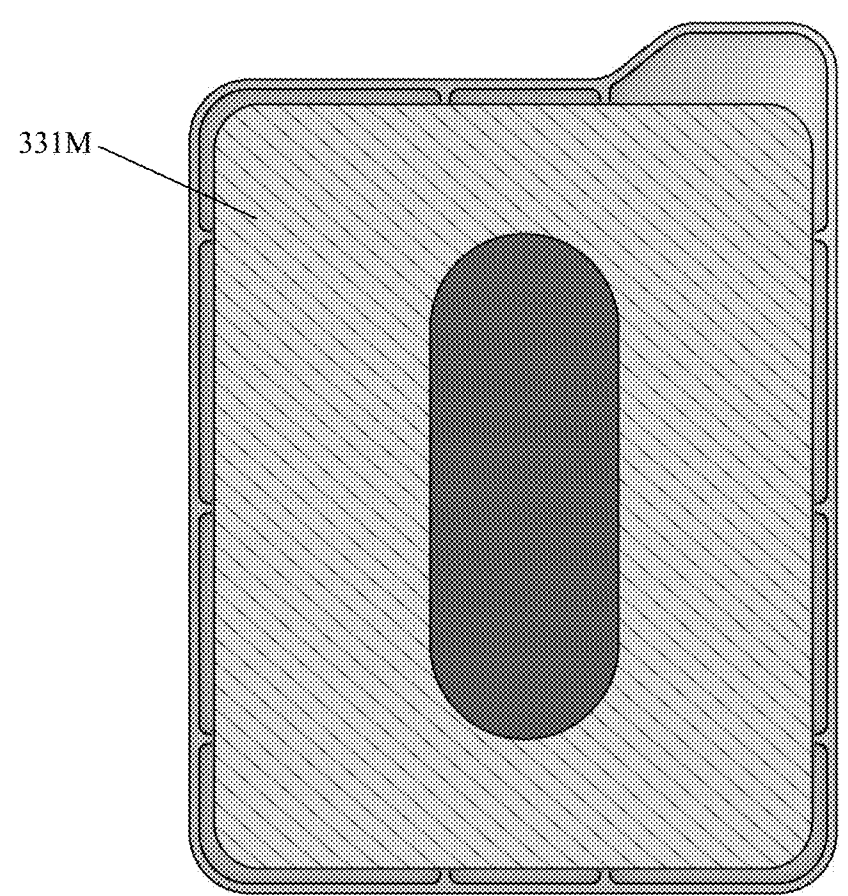
FIG. 24 is a front view of the pod embodiment of FIG. 23.

In another embodiment, as shown in FIG. 23-24, a pod 320 may be formed with a backing portion 331 that has a magnet 331M fixedly secured thereto, and which may be used to releasably secure the pod to a magnet that may be fixedly secured to the housing within the second housing cavity.

In yet another embodiment, as shown in FIG. 25-28, a pod 420 may be formed with a backing portion 431 that has a hinge 431H, which may be used to pivotally attach the pod to a corresponding hinge that may be fixedly secured to the housing within the second housing cavity or may be integrally formed therewith.

In yet another embodiment, as shown in FIGS. 29-31, a housing 501 may be formed with a pair of protrusions 501Pi/501Pii that protrude from its rear surface, which may slidably receive and engage (e.g., using a friction fit) first and second portions of a pod 520 that houses wipes that are always immediately accessible to the cell phone owner, without having to remove a cover.

Figure 32:
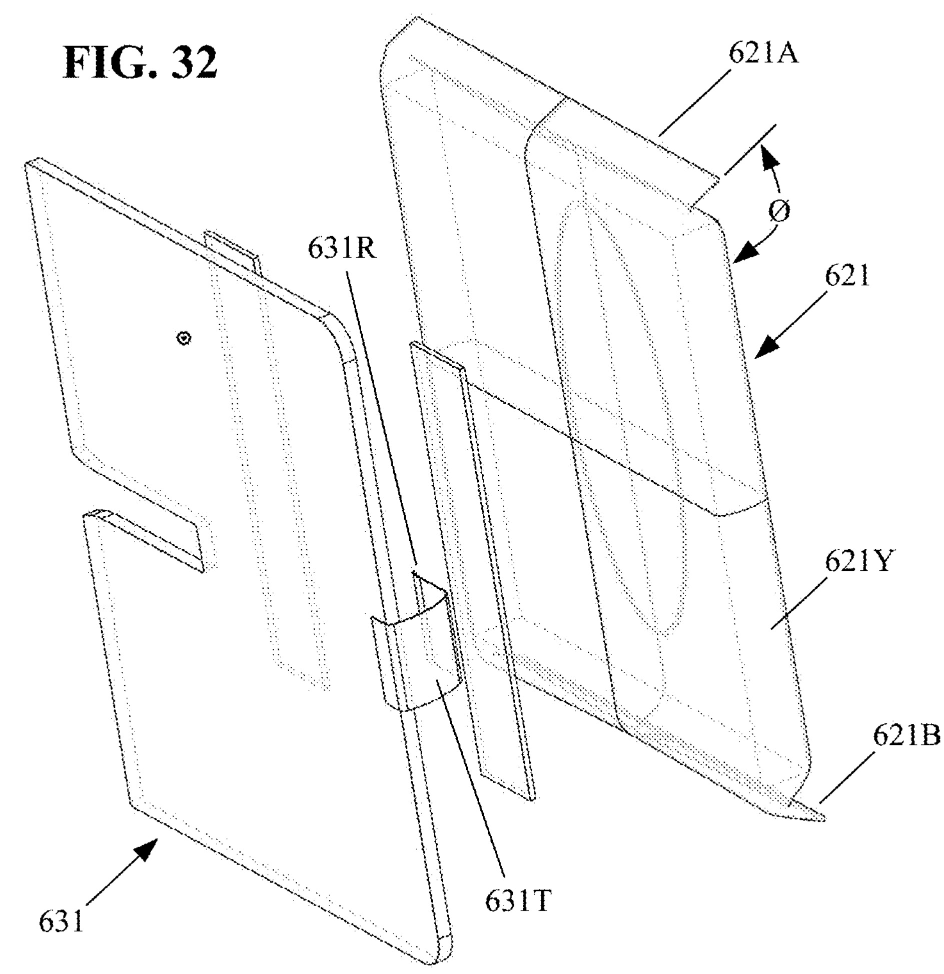
FIG. 32 is an exploded view of the component parts of another version of a pod that may be secured in a compartment of a phone case, being formed to include a wipe container, and backing structure.
Figure 33:
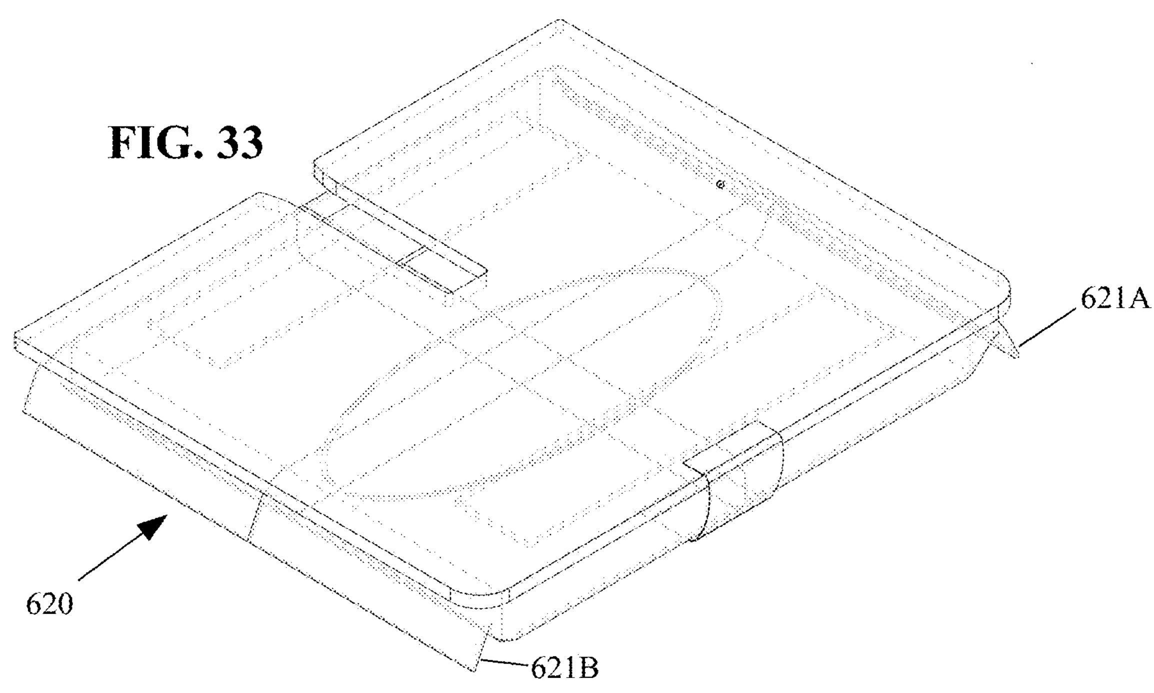
FIG. 33 is a perspective view of the component parts of the pod of FIG. 32, shown after being assembly together.

FIG. 33 shows another pod 620, and FIG. 32 is an exploded view of the container portion 621 and backing portion 631 that may be used to form that pod, which pod may be particularly configured to be releasably secured in a housing cavity of phone case housing 601. FIG. 34 is a perspective view of phone case housing 601 and the corresponding rear cover 651.

As seen in FIGS. 32-33, the container portion 621 of pod 620 may be formed to have a first flange 621A extend away from a first end thereof at an angle θ to the rectangular box-shaped body 621Y, and a second flange 621B extend away from its second end also at an angle to the rectangular box-shaped body. The flanges 621A/621B may each extend away at an angle being in the range of about 30 degrees to 60 degrees, and may preferably be at an angle of 45 degrees. Each of the flanges 621A/621B may be semi-rigid (e.g., being a thin rectangular piece of plastic or a plastic rectangular piece overlaid with an encapsulating material such as a disposable/food grade foil that is waterproof). Each of the flanges 621A/621B may nonetheless flex with respect to the body 621Y of the container portion to various different angles, being between zero and ninety degrees, and more preferably being flexible between 10 degrees and 80 degrees, and most preferably being flexible between 20 degrees and 70 degrees. Additionally, or alternatively each of the flanges 621A/621B may itself be deformable from being substantially planar into a curved or bowed shape, when opposing sides are loaded.

Figure 35:
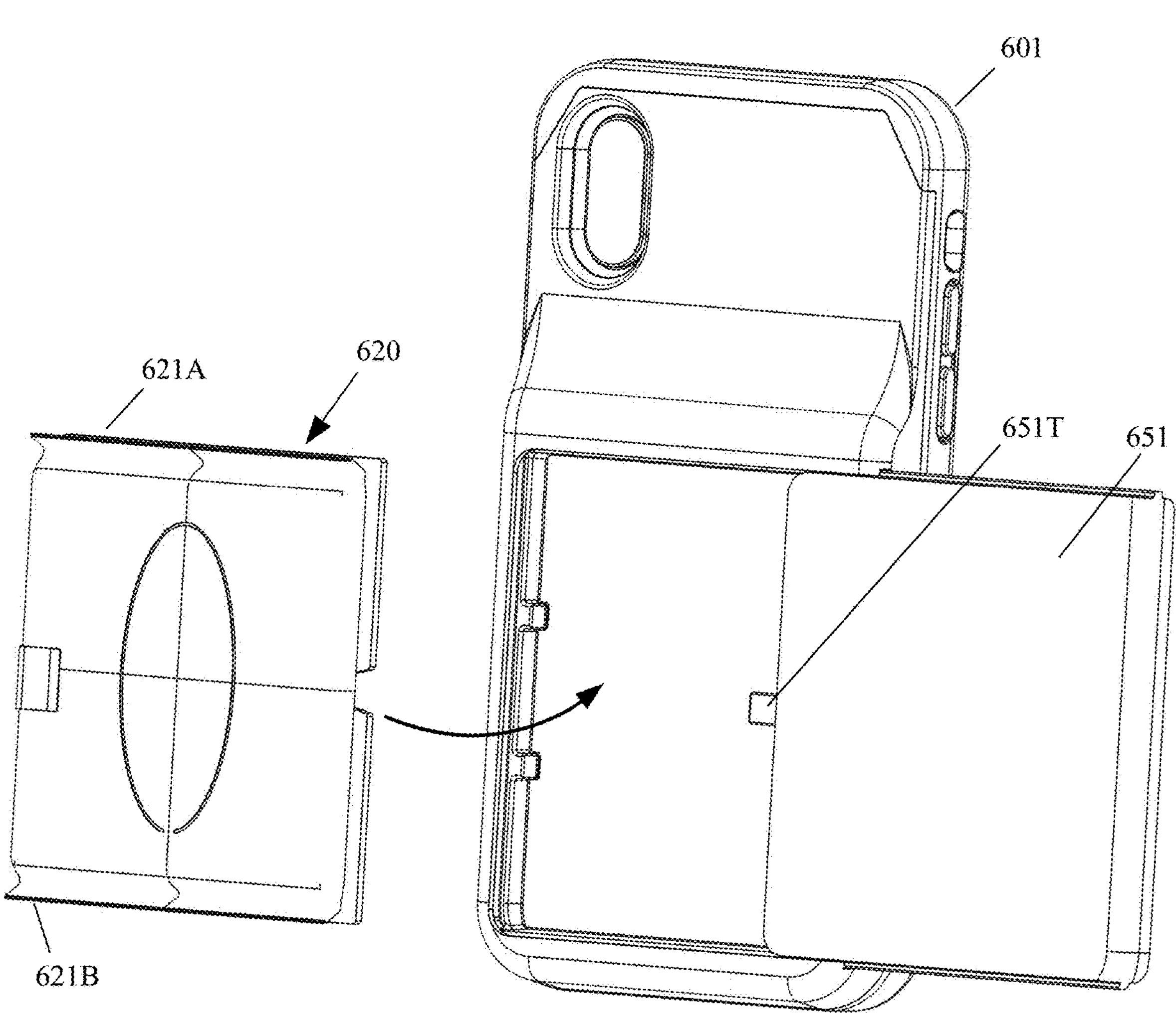
FIG. 35 is the perspective view of the phone case and cover of FIG. 34, and the pod of FIG. 33, shown prior to the pod being inserted into the rear compartment of the case.
Figure 35A:
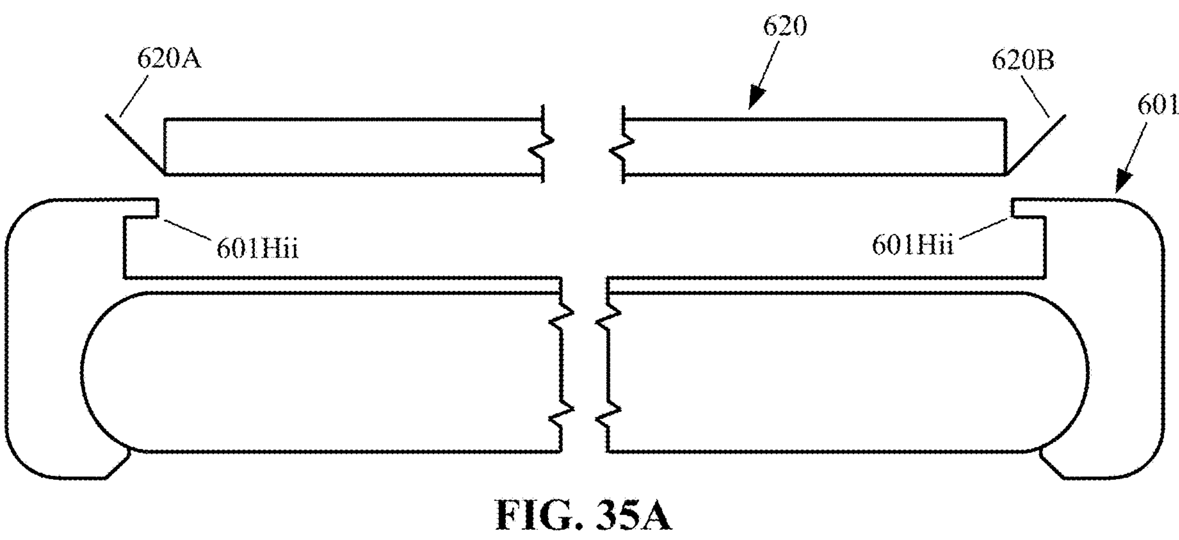
FIG. 35A is a cross-sectional view through the phone case housing and the pod of FIG. 34, shown just prior to the pod being inserted into the cavity of the housing.
Figure 35B:
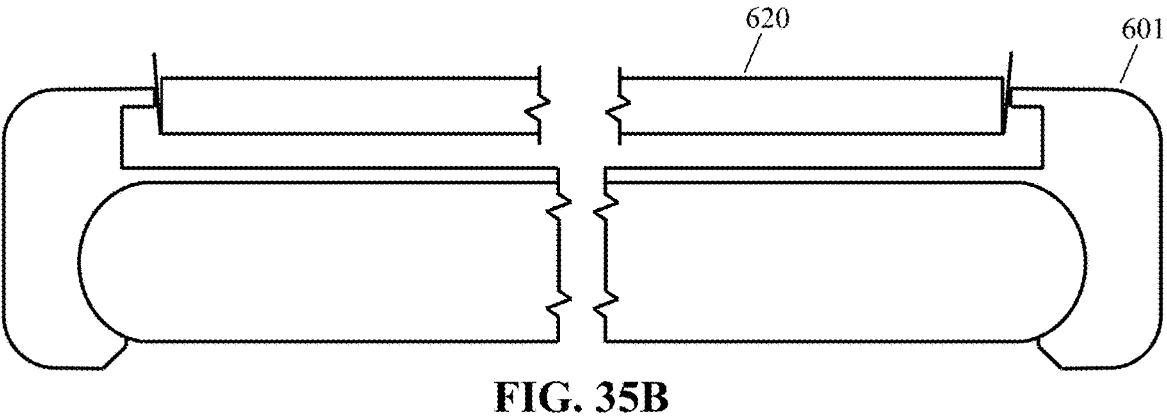
FIG. 35B is the cross-sectional view of FIG. 35A, shown while the pod is being inserted into the cavity of the housing, with the flanges of the pod deflected towards the body as a result of contact with the overhanging portion of the housing.
Figure 35C:
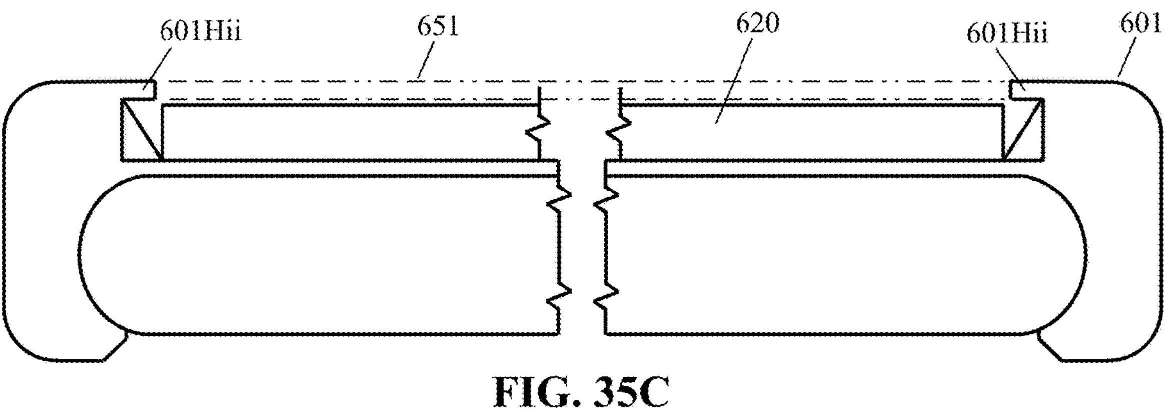
FIG. 35C is the cross-sectional view of FIG. 35B, shown after the pod has been inserted into the cavity of the housing.
Figure 36:
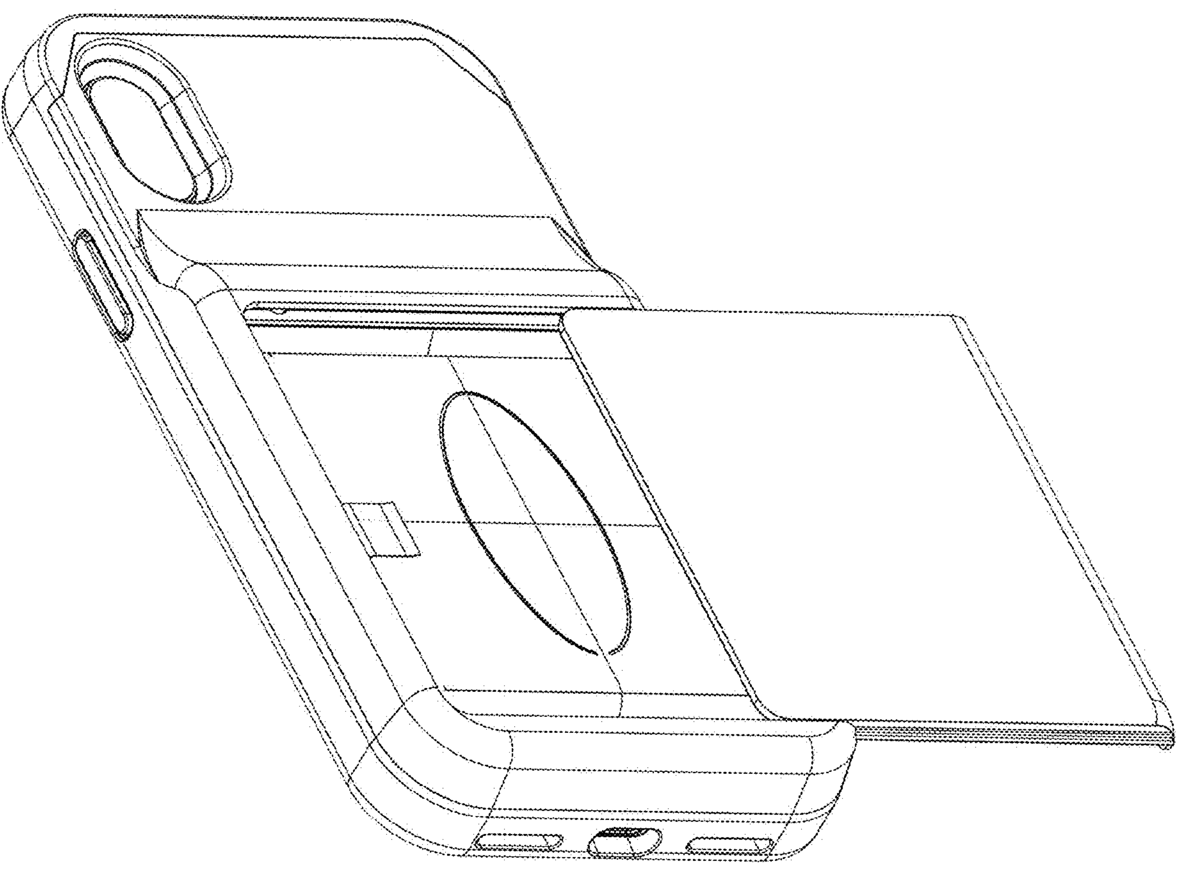
FIG. 36 is the perspective view of FIG. 35, shown just after the pod had been inserted into the rear compartment of the case.
Figure 37:
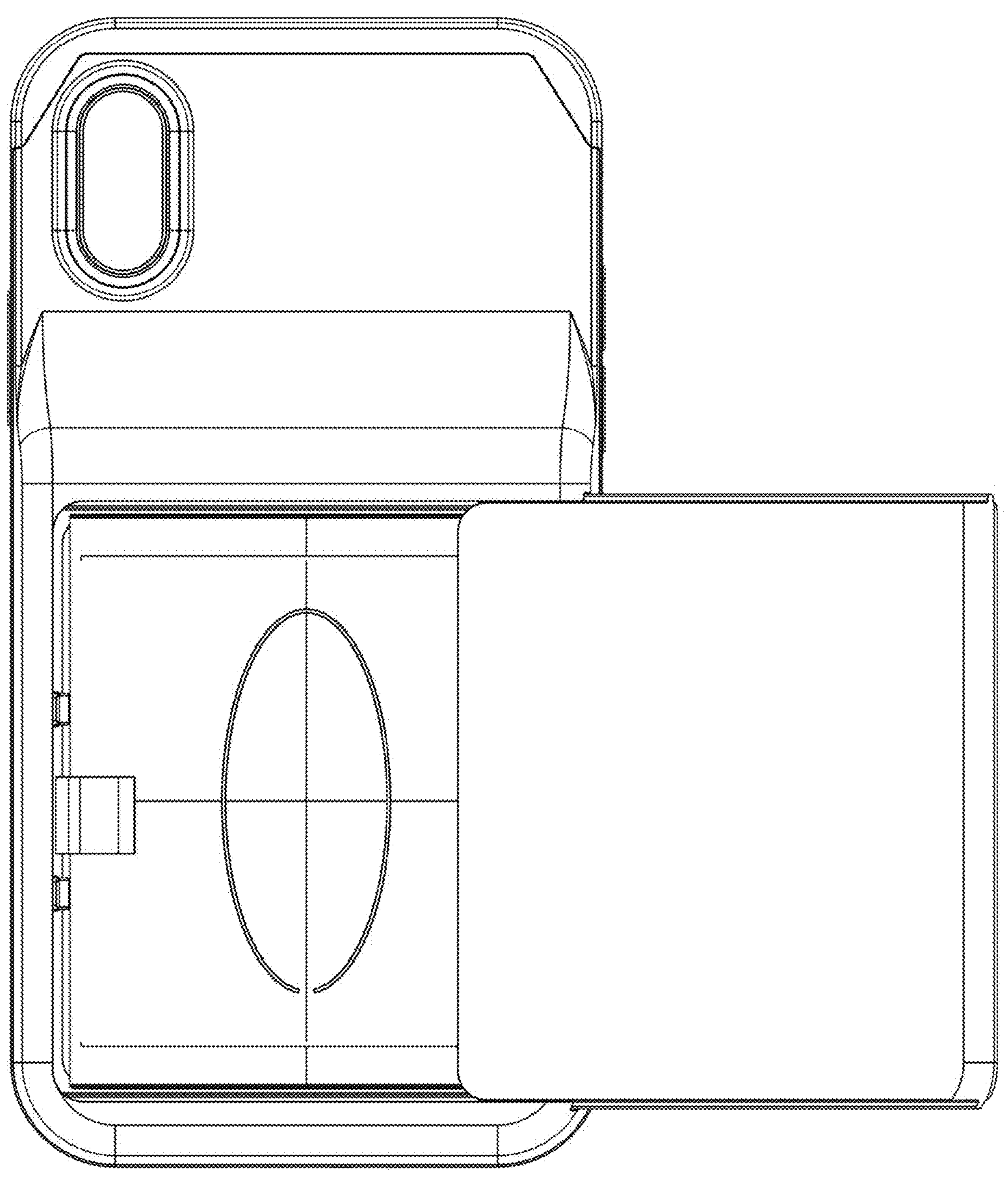
FIG. 37 is a front view of the phone case and pod, as shown in FIG. 36.

The compartment of the housing 601 may be particularly configured to receive and releasably retain the pod 620 therein, using first and second overhanging lip portions 601Hi and 601Hii (FIG. 34). Insertion of the pod 620 into the cavity of phone case housing 601 may occur by first orienting the pod such that the flanges 621A/621B face away from the housing (see FIGS. 35 and 25A). The body 621Y of the pod 620 may be pushed into the housing cavity, causing deflection of the flanges 621A/621B towards the body portion as a result of contact with the rear side of the housing (FIG. 35B), until the body portion of the pod is completely received within the housing cavity (FIG. 35C). As the body portion of the pod 620 is completely received within the housing cavity, the flanges 621A/621B spring back to their undeformed angular position (e.g., 45 degrees). The pod 620 is thereafter releasably retained in the housing cavity as a result of the flexible flanges 621A/621B, being positioned behind and blocked by the respective first and second overhanging portions 601Hi and 601Hii of the housing, after springing back to the undeformed position. As may be seen in FIG. 35, the length of the housing pod 620, including the flanges 621A/621B are sized to fit through the opening provided by the distance between the ends of the overhanging portions 601Hi and 601Hii, either in a slight interference fit or a clearance fit. Also, the depth of the body 621Y of the pod 620 is sized to be smaller than the depth of the second housing cavity, so as not to obstruct installation of the cover 651 when it is installed, which is indicated by the dot-dash lines shown in FIG. 35C.

The flexible flanges 621A/621B being positioned behind, and blocked by, the respective first and second overhanging housing portions 601Hi and 601Hii is designed to provide sufficient engagement to withstand the force created by pulling a wipe out from the container portion. However, the rigidity and strength of the flexible flanges 621A/621B are designed to easily be overcome by handling of a person of average strength, once the container portion is empty, whereby the cell phone owner grasps the container portion (e.g., at the opening 121P) and pulls it outward from the second housing cavity. The act of such pulling causes deformation of the flexible flanges 621A/621B, and/or deformation of the body of the container portion 621, thereby permitting it to freely be removed out of the opening that forms that housing cavity.

The cover 651 may be formed with a tab 651T that may engage a corresponding tab 631T of the backing portion, to latch the cover to the pod and the housing. To be properly positioned the tab 631T of the backing portion may be C-shaped, as seen in FIG. 32. Each of those tabs may have a pair of upwardly and downwardly oriented ramp surfaces (e.g., 631R) that may contact each other and act as a detent to releasably prevent disengagement of the tabs and hold the cover in place until the cover is positively actuated by the cell phone owner. The latch may obviate the need to use a slight friction fit between the cover protrusions (e.g., 151Pi) and the housing recesses (e.g., 101Si).

FIG. 38 is a perspective view showing a pod 720 just prior to being magnetically coupled within the rear compartment of a phone case housing 701, while FIG. 39 shows the pod just after being magnetically coupled within the rear compartment. As seen in FIG. 38, a portion of the phone case housing 701 (e.g., a central, circular portion) may have a magnet 701M fixedly secured therein, which magnet may be positioned in a recess to have its outwardly facing surface be substantially flush with the interior surface 701S of the housing cavity. The pod 720 may be similarly formed to include a magnet 720M, for magnetic coupling of the pod to the magnet 701M in the housing 701. Alternatively, a portion of the phone case housing 701 and a portion of the pod 720 may be formed to integrate magnetic materials therein during its manufacturing to accomplish the magnetic coupling. A cover may or may not be used in combination with this and the following embodiments.

In another embodiment, the magnet 701M that is fixedly secured in the phone case housing 701 may not be flush with the interior surface 701S of the housing cavity. Instead, the magnet 701M may protrude outwardly a small distance into the housing cavity, which may permit easier removal of the pod 720 by the cell phone owner, once it is empty, by simply pressing on one of the corners of the pod, to angle the pod to disengage the two magnets.

In yet another embodiment, rather than using a magnet in a central, circular portion that may exhibit magnet attraction to the center of the pod, four small magnets (not shown) may be used in each of the four corners of the housing cavity, to magnetically secure four correspondingly positioned magnets in the pod. This arrangement may better secure the pod within the housing cavity to prevent accidental dislodgement, but which may also make its removal slightly more difficult for the cell phone owner when the wipes are depleted. However, a tab 720T may be used on the pod to aid in such removal. Alternatively, a finger may be inserted into the opening into the cavity of the pod 720 to enable grasping of the pod to facilitate disengagement of the magnetic attachment of the pod to the case housing.

FIG. 40 and FIG. 41 are first and second perspective views showing a hygienic assembly 800, shown just after being magnetically coupled directly to a user's cell phone 99. The hygienic assembly 800 is configured to magnetically mount to any one or more of: a cell phone, a cell phone case, a refrigerator, as it is configured to magnetically mount to any ferromagnetic metallic object using a particularly shaped magnet utilized therein.

FIG. 41 and FIG. 42 are first and second exploded views of the component parts of the hygienic assembly 800, which is configured to provide immediate access to a pod of sanitizing wipes for a user. As seen in FIGS. 41-42, the hygienic assembly 800 may be formed to include a pod 810 that is configured to contain and store a plurality of sanitizing wipes, a sealing strip 819, a mounting member 820, and a magnet 840.

The mounting member 820 may include a particularly formed frame 821, and a magnet 829. The particularly formed frame 821 may be formed into an elongated rectangular shape to match a portion of an elongated rectangular shape of the cell phone 99, as seen in FIG. 40. The frame 821 may be formed of a web portion 822, a peripheral flange 823 that is configured to extend laterally away from the web 821, and a plurally of stiffeners that support the frame. In one embodiment, the web 821, the peripheral flange 823, and the plurality of stiffeners may all be formed separately and may be fixedly secured together using any suitable joining technique known in the art, including, but not limited to mechanical fasteners (e.g., rivets, screws, bolts, threaded inserts, nuts, etc.), adhesive, welding techniques, etc. In another embodiment, the web 821, the peripheral flange 823, and the plurality of stiffeners may all be integrally formed together as a single unitary part, and may be formed through an injection molding process, or a casting process, or a machining process, or any other suitable manufacturing process. The plurality of stiffeners may include a circular stiffener 824 that may be configured to be centrally positioned with respect to the peripheral flange 823. The circular stiffener 824 may create a recess into which the magnet 840 may be received. The circular stiffener 824 may simply surround the magnet 840, which may otherwise just rest against the nearside of the web 822 (i.e., its two planar sides may be coplanar with respect to the two planar sides of the peripheral flange 823 and the plurally of stiffeners). Additionally, or alternatively, the web 822 may be formed with a recess 822R that may have the same shape as the profile of the magnet 840, as seen in FIG. 42 and FIG. 43, so that in addition to the magnet being surrounded by the circular stiffener 824, a portion of the thickness of the magnet 840 may also be seated and fixedly secured within the recess

822R. The magnet may be fixedly secured therein using any suitable technique known in the art, but the use of adhesive may be preferable. A friction fit may additionally be utilized with respect to the circular stiffener 824, and/or the recess 822R. The plurality of stiffeners may also include one or more first stiffeners 825 each configured to protrude from the first side of the web 822, and to extend in a first direction between opposite sides of the peripheral flange 823 but terminating on the circular stiffener 824, which first direction may be parallel to the axial (long) direction of the frame 821 to match the long direction of the elongated rectangular shape of the cell phone 99. The plurality of stiffeners may also include one or more second stiffeners 826 each configured to extend in a second direction between the peripheral flange 823 and the circular stiffener, where the second direction is preferably perpendicular to the first direction.

The pod 810 may be formed of a plurality of walls or a single continuous wall, either of which are configured to create a cavity that is shaped to house a plurality of sanitizing wipes (not shown). An opening 810P formed in a side of the pod 810 provides access to the wipes stored in the cavity. A strip 819 is formed with a first portion that is sized to cover and extend beyond a periphery of the opening 810P, and releasably adhere to the pod 810 to seal the opening 810P, to house the sanitizing wipes in a waterproof manner. A second portion of the strip 819 may be configured to be grasped to unseal and reseal the first portion of the strip with respect to the pod 810 (see e.g., FIGS. 21A-21F). Note that in one embodiment, the web 822 and one side of the pod 810 may be integrally formed as a single unitary part (e.g., by injection molding), so that the stiffeners may protrude from a wall of the pod.

The magnet 840 may be formed into a thin hollow cylindrical shape 841, as seen in FIGS. 42-43, with a radially protruding portion 842 that is configured to extend from the hollow circular shaped towards a center (i.e., towards the axis) of the hollow cylindrical shape. The magnet 840 may be so shaped/sized to correspond to the Apple® iPhone® MagSafe® configuration, in which the circular periphery of the magnet encircles the wireless charging module that helps with wireless charging alignment. This configuration may provide for the best magnetic attachment to the phone. The magnet 840 may be made of a magnetized zinc alloy, or a sintered Neodymium magnet, or any other suitable magnet.

Use of two of the first stiffeners 825 may be preferable, as seen in FIG. 42, so that one of the first stiffeners 825 may be positioned on each side of the radially protruding portion 842 of the magnet 840, as seen in FIG. 42. Each of the first stiffeners 825 may be formed to be parallel to the radially protruding portion 842 of the magnet 840, both of which may be oriented be parallel to the axial (long) direction of the frame 821 to match the long direction of the elongated rectangular shape of the cell phone 99

When separately formed, the pod 810 may be mounted to a second side of the web 822 of the frame 821 of the mounting member 820 using any suitable joining technique known in the art, including, but not limited to, friction welding (particularly where plastics are utilized), adhesive, mechanical fasteners (e.g., rivets, screws, bolts, threaded inserts, nuts, etc.), a sliding friction fit, etc.

The frame 821 may be formed to have an elongated rectangular shape, as noted above, and in another embodiment, rather than being rectangular, the top of the frame may be formed to include a tab 827 that may be used as a leverage point for the user to remove the pod assembly 800, when utilized separately.

Figure 44:
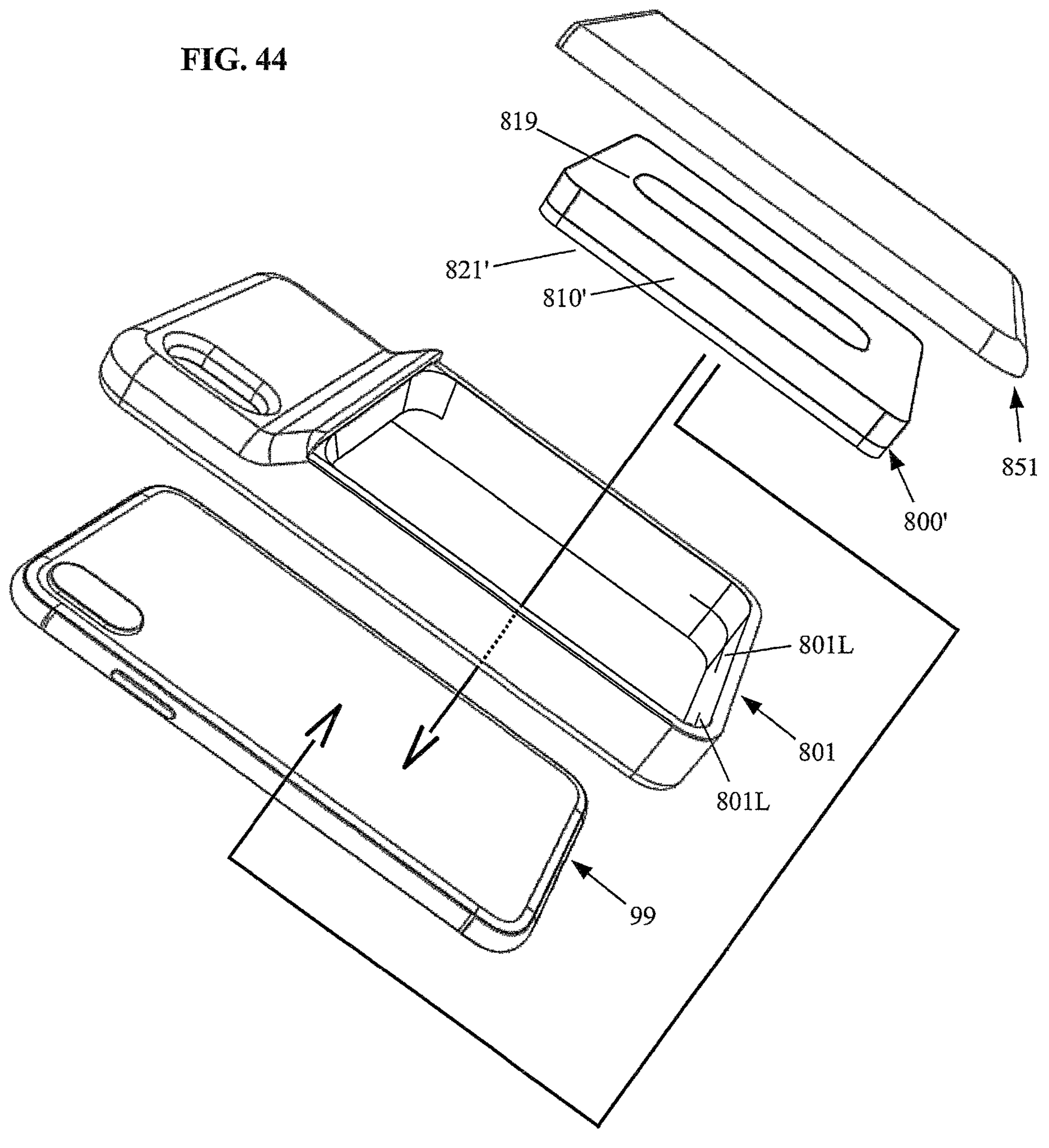
FIG. 44 is an exploded view showing use of a hygienic assembly configured to store a plurality of sanitizing wipes, a cell phone case, a cell phone, and an optional cover.

FIG. 44 is an exploded view showing use of a hygienic assembly 800' that may include a pod 810' that is configured to store a plurality of sanitizing wipes, a frame 821', a sealing strip or other resealable member 819' (e.g., a baggie type closure), an optional cell phone case/housing 801, and an optional cover 851. The pod 810' and frame 821' may be formed the same as any of the embodiments described above, and may additionally or alternatively be formed so that the lateral sides of the frame 821' and the lateral sides of the pod 810' are coextensive, or alternatively, the extent of the sides of the frame may be slightly smaller than the extent of the sides of the pod. The phone 99 may be received through a first opening on a first side of the cell phone case/housing 801 into a first compartment, and the hygienic assembly 800' may be received through a second opening on a second side of the cell phone case/housing 801 into a second compartment, which first and second compartments may be separated by a wall. Alternatively, as seen in FIG. 44, at least a portion of those two compartments may be interconnected and are not separated by the wall, and the cell phone 99 may be supported by a lip 801L at one or more locations in the interconnected compartments of the cell phone case/housing 801. The periphery of the joined pod 810' and frame 821' may be formed to be received through the opening on the rear of the cell phone case/housing 801, and may be received in the second compartment in a clearance fit (or alternatively it may be received therein using a very slight friction fit). Where no wall is used to separate the two compartments, the magnet supported by the frame 821' (and pod 810') may magnetically couple directly to the MagSafe® region of the phone 99. Also, forming the extent of the side of the frame to be slightly smaller than the extent of the side of the pod may enable the magnet to directly contact the back of the phone, as the frame may thereby avoid contacting the lip 801L, and additionally or alternatively, the magnet may protrude from the back face of the frame to ensure such contact between the magnet and the cell phone. Where a wall is used to separate the two compartments, the magnet that is supported by at least the frame 821' of the hygienic assembly 800' may magnetically couple a magnet that may be embedded within or attached to that wall.

Figure 45:
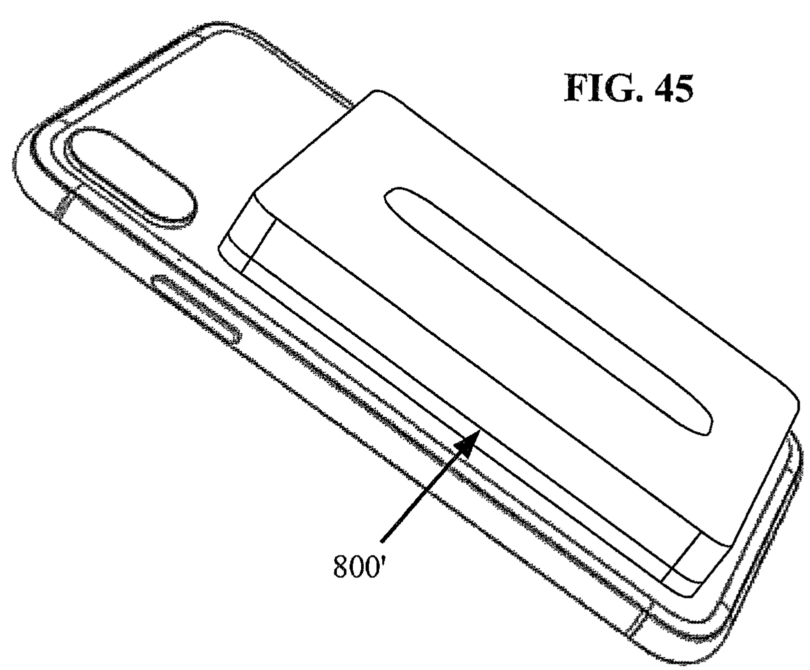
FIG. 45 is a perspective view showing the hygienic assembly of FIG. 44 being magnetically coupled directly to the cell phone of FIG. 44.

FIG. 45 is a perspective view showing the frame 821' and pod 810' of the hygienic assembly 800' after being magnetically coupled directly to the cell phone 99, without the use of the cell phone case/housing 801.

Figure 46:
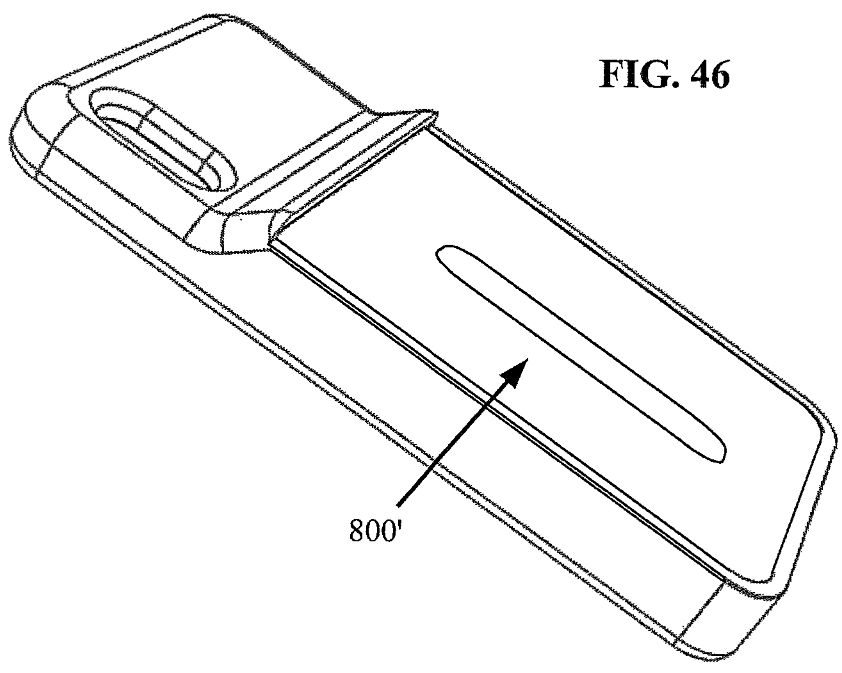
FIG. 46 is a perspective view showing the hygienic assembly of FIG. 44 being received within a compartment of the phone case of FIG. 44, being magnetically coupled either directly to the cell phone of FIG. 44 or to a wall of the case.

FIG. 46 is a perspective view showing the frame 821' and pod 810' of the hygienic assembly 800' of FIG. 44 after being received within the compartment of the cell phone case/housing 801, whereat the magnet of the hygienic assembly may be magnetically coupled directly to the cell phone 99. Note that where a wall may be utilized to separate the two compartments of the cell phone case/housing, the magnet of the hygienic assembly 800' may be magnetically coupled to the magnet embedded within or secured to that interior wall of the cell phone case/housing 801.

The frame 821' and/or pod 810' of the hygienic assembly 800' may be formed to include a pull tab to aid in its removal from the compartment, thereby permitting replacement with another hygienic assembly, where the pull tab may be formed the same as or similar to the tab 720T described above.

While illustrative implementations of one or more embodiments of the disclosed apparatus are provided hereinabove, those skilled in the art and having the benefit of the present disclosure will appreciate that further embodiments may be implemented with various changes within the scope of the disclosed apparatus. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A hygienic assembly for a cell phone, said hygienic assembly comprising:

a web;

a frame, said frame configured to extend from said web, said frame comprising: a recess, said recess being formed with a shaped periphery and said recess configured to extend to a depth;

a magnet, said magnet having a peripheral shape configured to match said shaped periphery of said recess, and said magnet having a thickness being equal to or less than said depth of said recess;

wherein said magnet is received in said recess and fixedly secured to a first side of said web;

a container portion, said container portion comprising:

a plurality of walls that create a cavity configured to house a plurality of sanitizing wipes; and an opening formed in one of said plurality of walls, said opening configured to interconnect with said cavity;

a strip, a first portion of said strip being sized to cover and extend beyond a periphery of said opening, and configured to releasably adhere to said container portion to seal said opening when in contact with said container portion, to house the sanitizing wipes in a waterproof manner; a second portion of said strip configured to be grasped to unseal and reseal said first portion of said strip with respect to said container portion;

wherein said container portion is mounted to a second side of said web; and wherein said hygienic assembly is thereby configured for magnetic attraction to any ferromagnetic metallic object using said magnet.

2. The hygienic assembly according to claim 1, wherein said magnet is formed into a thin hollow cylindrical shape with a radially protruding portion configured to extend from said thin hollow cylindrical shape towards the axis of said thin hollow cylindrical shape.

3. The hygienic assembly according to claim 2, wherein said frame comprises:

a peripheral flange, said peripheral flange configured to protrude from a periphery of said first side of said web;

a circular stiffener, wherein said recess in said frame is formed by said circular stiffener, wherein said circular stiffener is configured to protrude away from a central portion of said first side of said web;

one or more first stiffeners each configured to protrude from said first side of said web, and to extend in a first direction between said peripheral flange and said circular stiffener; and one or more second stiffeners each configured to protrude from said first side of said web, and to extend in a second direction between said peripheral flange and said circular stiffener.

4. The hygienic assembly according to claim 3, wherein said first direction is perpendicular to said second direction.

5. The hygienic assembly according to claim 3, wherein said web is rectangular-shaped; and wherein said one or more first stiffeners comprises two first stiffeners each configured to protrude parallel to said radially protruding portion of said magnet, being disposed on opposite sides of said radially protruding portion of said magnet.

6. The hygienic assembly according to claim 1, wherein said web, said frame, and said container portion are integrally formed as a single unitary part.

7. The hygienic assembly according to claim 1, further comprising: a case, wherein said case comprises:

a first opening defining a front wall surface and a peripheral wall surface that form a first compartment configured to receive and house a cell phone;

a second opening defining a rear wall surface and a side wall surface that form a second compartment;

wherein a shape of said side wall surface and a depth of said side wall surface are configured to match said shaped periphery and said depth of said pod, to slidably receive said pod through said second opening into said second compartment.

8. The hygienic assembly according to claim 7, wherein at least a portion of said first compartment is interconnected with at least a portion of said second compartment; and wherein said magnet of said pod is configured to magnetically couple to a safe region of the cell phone when the cell phone is mounted within said first compartment.

* * * * *